(12) United States Patent
Juneau

(10) Patent No.: US 7,958,524 B2
(45) Date of Patent: Jun. 7, 2011

(54) METHOD AND SYSTEM FOR DETECTING AND PREVENTING UNAUTHORIZED SIGNAL USAGE IN A CONTENT DELIVERY NETWORK

(75) Inventor: J. Rene Juneau, Ontario (CA)

(73) Assignee: Maxxian Technology Inc., Thornhill, Ontario (CA)

( * ) Notice: Subject to any disclaimer, the term of this patent is extended or adjusted under 35 U.S.C. 154(b) by 1220 days.

(21) Appl. No.: 10/575,908

(22) PCT Filed: Oct. 15, 2004

(86) PCT No.: PCT/CA2004/001831
§ 371 (c)(1),
(2), (4) Date: Jul. 21, 2006

(87) PCT Pub. No.: WO2005/036820
PCT Pub. Date: Apr. 21, 2005

(65) Prior Publication Data
US 2007/0076872 A1   Apr. 5, 2007

Related U.S. Application Data

(60) Provisional application No. 60/511,790, filed on Oct. 16, 2003.

(51) Int. Cl.
  *G06F 9/00* (2006.01)
  *G06F 15/16* (2006.01)
  *G06F 17/00* (2006.01)
(52) U.S. Cl. ............... 725/14; 725/27; 725/28; 725/29; 725/31; 725/35; 725/104; 726/27

(58) Field of Classification Search ............... 725/32–36
See application file for complete search history.

(56) References Cited

U.S. PATENT DOCUMENTS

| 4,461,032 A |   | 7/1984  | Skerlos |
| 4,510,623 A |   | 4/1985  | Bonneau et al. |
| 4,975,951 A | * | 12/1990 | Bennett ........................ 380/231 |
| 5,146,496 A |   | 9/1992  | Westerfer et al. |
| 5,224,161 A |   | 6/1993  | Daniel et al. |
| 5,251,324 A |   | 10/1993 | McMullan |
| 5,438,620 A |   | 8/1995  | Ryan et al. |

(Continued)

FOREIGN PATENT DOCUMENTS

JP   2000244284 A  *  9/2000

(Continued)

OTHER PUBLICATIONS

Machine Translation of JP 2000244284 A.*

(Continued)

*Primary Examiner* — Andrew Y Koenig
*Assistant Examiner* — Jason Chung
(74) *Attorney, Agent, or Firm* — Kilpatrick Townsend & Stockton LLP

(57) ABSTRACT

A method and system for controlling unauthorized signal usage in a content delivery network, such as a television network, is described. The method and system acquires at least two signal usage records for a receiver of the content, evaluates the at least two signal usage records for indicia of usage of a combination of signals not normally authorized on the receiver, and detects unauthorized signal usage upon the at least two signal usage records being consistent with such indicia.

45 Claims, 15 Drawing Sheets

U.S. PATENT DOCUMENTS

| | | | |
|---|---|---|---|
| 5,485,518 | A | 1/1996 | Hunter et al. |
| 5,621,793 | A * | 4/1997 | Bednarek et al. ............ 380/240 |
| 5,828,402 | A | 10/1998 | Collings |
| 5,859,874 | A | 1/1999 | Wiedeman et al. |
| 5,867,226 | A * | 2/1999 | Wehmeyer et al. ............ 725/46 |
| 5,880,769 | A | 3/1999 | Nemirofsky et al. |
| 5,905,859 | A | 5/1999 | Holloway et al. |
| 5,970,206 | A | 10/1999 | Yuen et al. |
| 6,009,116 | A * | 12/1999 | Bednarek et al. ............ 375/130 |
| 6,011,973 | A | 1/2000 | Valentine et al. |
| 6,035,037 | A * | 3/2000 | Chaney ........................ 380/227 |
| 6,057,756 | A | 5/2000 | Engellenner |
| 6,067,440 | A | 5/2000 | Diefes |
| 6,154,206 | A | 11/2000 | Ludke |
| 6,177,931 | B1 * | 1/2001 | Alexander et al. ............. 725/52 |
| 6,381,747 | B1 * | 4/2002 | Wonfor et al. ................ 725/104 |
| 6,389,538 | B1 | 5/2002 | Gruse et al. |
| 6,553,413 | B1 | 4/2003 | Leighton et al. |
| 6,754,908 | B1 * | 6/2004 | Medvinsky ................... 725/107 |
| 7,028,335 | B1 | 4/2006 | Borella et al. |
| 7,519,811 | B1 | 4/2009 | Hara |
| 7,530,108 | B1 * | 5/2009 | Cocchi et al. ................... 726/26 |
| 2002/0021665 | A1 | 2/2002 | Bhagavath et al. |
| 2002/0087663 | A1 | 7/2002 | Chou et al. |
| 2002/0092015 | A1 * | 7/2002 | Sprunk et al. ..................... 725/9 |
| 2002/0104083 | A1 * | 8/2002 | Hendricks et al. ............. 725/34 |
| 2003/0018445 | A1 | 1/2003 | Vince et al. |
| 2003/0097657 | A1 * | 5/2003 | Zhou et al. ...................... 725/46 |
| 2004/0055010 | A1 * | 3/2004 | Fries et al. ....................... 725/60 |
| 2004/0123329 | A1 * | 6/2004 | Williams et al. .............. 725/111 |
| 2004/0194124 | A1 * | 9/2004 | Medvinsky ..................... 725/25 |
| 2005/0055709 | A1 | 3/2005 | Thompson |
| 2005/0108529 | A1 | 5/2005 | Juneau |
| 2006/0053279 | A1 | 3/2006 | Coueignoux |
| 2006/0259984 | A1 | 11/2006 | Juneau |

FOREIGN PATENT DOCUMENTS

WO    WO 02/054765 A1 * 7/2002

OTHER PUBLICATIONS

U.S. Appl. No. 11/422,249, filed Jun. 5, 2006, Office Action dated Jun. 19, 2009, 14 pages.
U.S. Appl. No. 11/422,249, filed Jun. 5, 2006, Final Office Action dated Mar. 25, 2010, 17 pages.
U.S. Appl. No. 11/422,249, filed Jun. 5, 2006, Advisory Action dated Jul. 12, 2010, 3 pages.
U.S. Appl. No. 11/422,249, filed Jun. 5, 2006, Office Action dated Sep. 2, 2010, 15 pages.
U.S. Appl. No. 10/964,621, filed Oct. 15, 2004, Office Action dated Nov. 20, 2007, 20 pages.
U.S. Appl. No. 10/964,621, filed Oct. 15, 2004, Final Office Action dated Jul. 9, 2008, 20 pages.
U.S. Appl. No. 10/964,621, filed Oct. 15, 2004, Advisory Action dated Sep. 18, 2008, 4 pages.
U.S. Appl. No. 10/964,621, filed Oct. 15, 2004, Office Action dated Mar. 9, 2009, 23 pages.
U.S. Appl. No. 10/964,621, filed Oct. 15, 2004, Final Office Action dated Dec. 23, 2009, 28 pages.
U.S. Appl. No. 10/964,621, filed Oct. 15, 2004, Advisory Action dated Mar. 26, 2010, 3 pages.
U.S. Appl. No. 10/964,621, filed Oct. 15, 2004, Office Action dated Aug. 5, 2010, 24 pages.

* cited by examiner

Figure 11
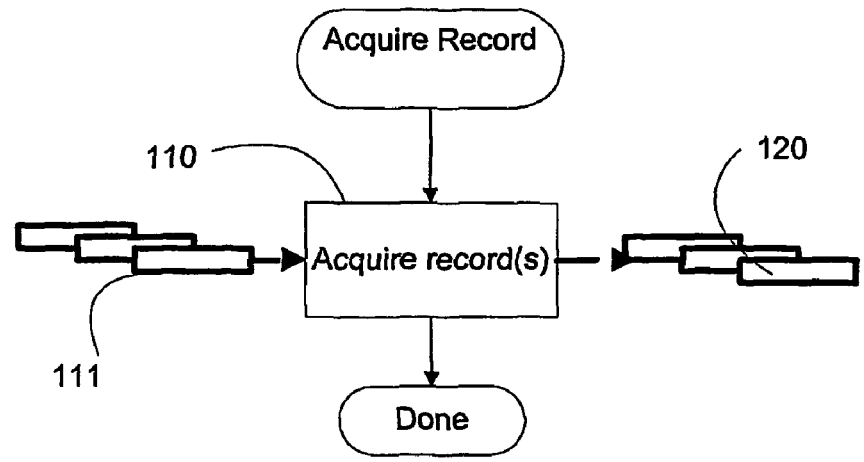
11 A
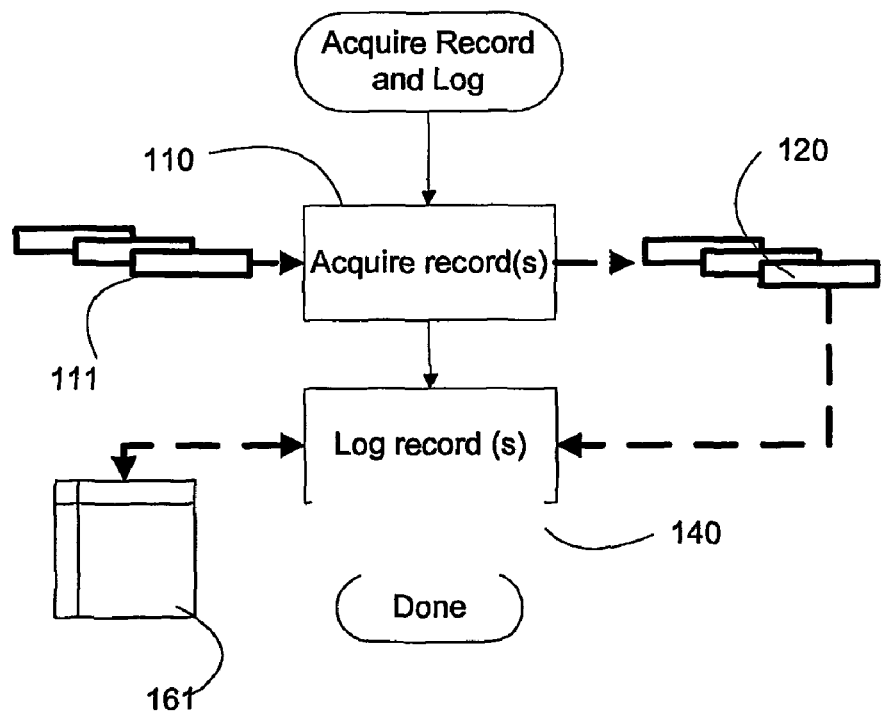
11 B

METHOD AND SYSTEM FOR DETECTING AND PREVENTING UNAUTHORIZED SIGNAL USAGE IN A CONTENT DELIVERY NETWORK

FIELD OF INVENTION

This invention relates generally to detecting and preventing unauthorized signal usage in a content delivery network, and more particularly to the detection and prevention of unauthorized signal usage for content distributed by way of wired or wireless networks to subscriber receiving devices.

BACKGROUND OF THE INVENTION

In a typical distribution system of signals in a content delivery network, such as for cable or satellite television, there are various components that reside on a single physical system or on separate systems linked by one or more communication networks. Such content delivery networks may include content providers which provide content delivered across the network, such as audio, video, data, applications, or combinations thereof.

In a content delivery network, the content is typically provided by content providers into the content delivery network as one or more signals. Such signals are typically encoded to prevent unauthorized access and use of the signal. Receivers, such as digital television receiver units, receive from the network and use such encoded signals for use by users. A receiver typically includes a decode function so that receivers may make use of the encoded signals it receives from the content delivery network. A content delivery network also typically includes a conditional access system connected to the network, which controls the content that any particular receiver may access and use. The conditional access system typically operates in conjunction with the receivers to control the content that any one receiver may access and use. A receiver typically perform checks with the conditional access system to determine the particular content that it is permitted to receive and use, and then decode only such authorized content.

Additional background details regarding content delivery networks, conditional access systems, and technologies deployed therein are described in the following United States patents, the disclosure of which are hereby incorporated by reference:
U.S. Pat. No. 4,461,032 to Skerlos
U.S. Pat. No. 4,510,623 to Bonneau et al.
U.S. Pat. No. 5,146,496 to Westerfer et al.
U.S. Pat. No. 5,224,161 to Daniel et al.
U.S. Pat. No. 5,880,769 to Nemirofsky et al.
U.S. Pat. No. 5,970,206 to Yuen et al.
U.S. Pat. No. 6,067,440 to Diefes
U.S. Pat. No. 5,485,518 to Hunter et al.
U.S. Pat. No. 5,828,402 to Collings
U.S. Pat. No. 5,438,620 to Ryan et al.

Some conditional access systems known in the art have been compromised in a manner that allows for unauthorized usage of content signals. Methods of compromising these systems include deliberate or accidental operational errors, exploitation of design or operational flaws in the systems, and "hacking" or reverse-engineering of the systems.

Detection of unauthorized access and usage may often be rendered difficult, as a compromised receiver may not have a method of communicating back with the conditional access system, or the return communication means may be disabled on the compromised receiver.

Correction of conditional access problems may also be a lengthy process, with compromised (also known as "pirated") systems sometimes remaining in operation for several years, with a succession of counter-measures and counter-counter-measures being deployed respectively by the content delivery network operators and hackers.

There is a need for a system and method for providing conditional access to a content delivery network wherein unauthorized usage of signals by a receiver may be detected, and having such a receiver optionally disabled.

SUMMARY OF THE INVENTION

In accordance with an aspect of the present invention, a method for detecting unauthorized signal usage in a content delivery network is provided. The method comprises the steps of: acquiring at least two signal usage records for a receiver of the content; evaluating the at least two signal usage records for indicia of usage of a combination of signals not normally authorized on the receiver; and detecting unauthorized signal usage upon the at least two signal usage records being consistent with the indicia.

The indicia may include use at the receiver of at least two signals each of which is only normally authorized for use in mutually distinct geographic locations. Usage of each at least two signals may be associated with a geographic blackout region, wherein geographic locations in which usage is normally authorized for any one of the at least two signals by reference to its respective blackout region is exclusive from geographic locations in which usage is normally authorized for all others of the at least two geographic blackout regions associated with every other of the at least two signals.

The method may further comprise disabling the receiver in the content delivery network upon detecting unauthorized signal usage at the receiver.

At least one of the steps of acquiring at least two signal usage records, evaluating the at least two usage signal records, detecting unauthorized signal usage and disabling the receiver may be performed at a different time than in immediate succession to each other of the steps. The steps of acquiring at least two signal usage records, evaluating the at least two usage records, detecting unauthorized signal usage and disabling the receiver may be performed by the receiver.

The content delivery network may include a conditional access system in communication with the receiver. The steps of acquiring of at least two signal usage records, evaluating said at least two signal usage records, detecting unauthorized signal usage and disabling said receiver may be performed by the conditional access system. Further, the receiver may perform at least one of the steps of acquiring at least two signal usage records, evaluating the at least two signal usage records, detecting unauthorized signal usage and disabling the receiver, and the conditional access system may perform a step other than the at least one of the steps.

The receiver may be associated with an interactive television system.

The steps of evaluating the at least two signal usage records and detecting unauthorized signal usage may be performed by at least one of the receiver, an advertising management system, a blackout control subsystem, a conditional access system, a multiplexer, and a parental control system, in each case being connected to the content delivery network.

The indicia of usage of a combination of signals not normally authorized on the receiver may include indicia of concurrent usage of two or more pay-per-usage signals. The indicia of concurrent usage of two or more pay-per-usage signals may also include indicia of usage of the two or more pay-per-usage signals within a predetermined period of time. Further, the indicia of concurrent usage of the two or more pay-per-usage signals may include indicia of picture-in-picture presentation of at least two of the two or more pay-per-usage signals. Still further, the indicia of concurrent usage of the two or more pay-per-usage signals may include indicia of recording of at least one of the two or more pay-per-usage signals while another of the two or more pay-per-usage signal is being used. Further still, the indicia of concurrent usage of the two or more pay-per-usage signals may include indicia of multi-channel presentation of the two or more pay-per-usage signals. Furthermore, the indicia of multi-channel presentation may include presentation of the two or more pay-per-usage signals in an electronic program guide.

In another aspect of the present invention, a method for controlling unauthorized signal usage in a content delivery network is provided. The method comprises the steps of: acquiring geographic indicia for a receiver of the content, the geographic indicia identifying a geographic location associated with the receiver; acquiring at least one signal usage record for the receiver; evaluating the at least one signal usage record for indicia of usage of at least one signal not normally authorized on the receiver; and detecting unauthorized signal usage upon the at least one signal usage record having indicia of usage of a signal not normally authorized for usage in the geographic location.

The indicia of usage of the at least one signal not normally authorized on the receiver may include indicia of usage corresponding to a signal controlled by a geographic blackout region which does not normally permit usage of the signal in the geographic location of the receiver. The geographic indicia may comprise data associated with the time zone of the geographic location. The geographic indicia may also comprise data associated with a global positioning system or the postal code of the geographic location.

The method may further comprise disabling the receiver in the content delivery network upon detecting unauthorized signal usage at the receiver.

At least one of the steps of acquiring a geographic indicia, acquiring at least one usage signal, evaluating the at least one usage record, detecting unauthorized signal usage and disabling the receiver may be performed at a different time than in immediate succession to each other of the steps.

The steps of acquiring a geographic indicia, acquiring at least one record, evaluating the at least one usage record, detecting unauthorized signal usage and disabling the receiver may be performed by the receiver.

The content delivery network may include a conditional access system in communication with the receiver. The steps of acquiring a geographic indicia, acquiring at least one record, evaluating the at least one usage record, detecting unauthorized signal usage and disabling the receiver may be performed by the conditional access system. Further, the receiver may perform at least one of the steps of acquiring a geographic indicia, acquiring at least one record, evaluating the at least one usage record, detecting unauthorized signal usage and disabling the receiver, and the conditional access system may perform a step other than the at least one of the steps.

The receiver may be associated with an interactive television system.

The step of evaluating the at least one usage record may be performed by at least one of the receiver, an advertising management system, a blackout control subsystem, a conditional access system, a multiplexer, and a parental control system, in each case being connected to the content delivery network.

The method may further comprise acquiring a geographic indicia for the receiver to identify a geographic location associated with the receiver, and wherein the indicia of usage include at least two of: use at the receiver of at least two signals each of which is only normally authorized for use in mutually distinct geographic locations; use at the receiver of a signal not normally authorized for usage in the geographic location associated with the receiver; and concurrent usage of two or more pay-per-usage signals.

In yet another aspect of the present invention, a system for detecting unauthorized signal usage in a content delivery network is provided. The system comprises: a record acquisition module for acquiring at least two signal usage records for a receiver of the content; a data set of indicia of usage of a combination of signals not normally authorized on the receiver; and an evaluation module for evaluating the at least two signal usage records against the indicia, wherein unauthorized signal usage is detected upon the at least two signal usage records being consistent with the indicia.

The system may further comprise a disabling module for disabling the receiver upon detecting unauthorized signal usage at the receiver.

The record acquisition module, evaluation module and disabling module may each executes at a different time than in immediate succession to each other.

The record acquisition module, data set of indicia, evaluation module, and disabling module may be associated with at least one network element in the content delivery network.

One of the at least one network element may be any one of the receiver, an advertising management system, a blackout control system, a conditional access system, a multiplexer and a parental control system.

The indicia may include use at the receiver of at least two signals each of which is only normally authorized for use in mutually distinct geographic locations. Usage of each at least two signals may be associated with a geographic blackout region, wherein geographic locations in which usage is normally authorized for any one of the at least two signals by reference to its respective blackout region is distinct from geographic locations in which usage is normally authorized for all others of the at least two geographic blackout regions associated with every other of the at least two signals.

The indicia of usage of a combination of signals not normally authorized on said receiver may include concurrent usage of two or more pay-per-usage signals. The indicia of concurrent usage of two or more pay-per-use signals may also include indicia of usage of the two or more pay-per-usage signals within a predetermined period of time. Further, the indicia of concurrent usage of the two or more pay-per-usage signals may include indicia of picture-in-picture presentation of at least two of the two or more pay-per-usage signals.

Still further, the indicia of concurrent usage of the two or more pay-per-usage signals may include indicia of recording of at least one of the two or more pay-per-usage signals while another of the two or more pay-per-usage signal is being used. Further still, the indicia of concurrent usage of the two or more pay-per-usage signals may include indicia of multi-channel presentation of the two or more pay-per-usage signals. Furthermore, the indicia of multi-channel presentation may include presentation of the two or more pay-per-usage signals in an electronic program guide.

The acquisition module may further acquire a geographic indicia for the receiver to identify a geographic location associated with the receiver, and the indicia may include indicia of usage of a signal not normally authorized for usage in the geographic location of the receiver.

The indicia of usage of the at least one signal not normally authorized on the receiver may include indicia of usage corresponding to a signal controlled by a geographic blackout region which does not normally permit usage of the signal in the geographic location of the receiver.

The geographic indicia may comprise data associated with the time zone of the said geographic location. The geographic indicia may also comprise data associated with a global positioning system, or with the postal code of the geographic location.

The acquisition module may further acquires a geographic indicia associated with the receiver, and the indicia may include at least two of: use at the receiver of at least two signals each of which is only normally authorized for use in mutually distinct geographic locations; use at the receiver of a signal not normally authorized for usage in the geographic location associated with the receiver; and concurrent usage of two or more pay-per-usage signals.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 11A is a flow diagram of usage record acquisition in the network of FIG. 1.

FIG. 11B is a flow diagram of usage record acquisition and logging in the network of FIG. 1.

DETAILED DESCRIPTION OF EMBODIMENTS

Figure 1:
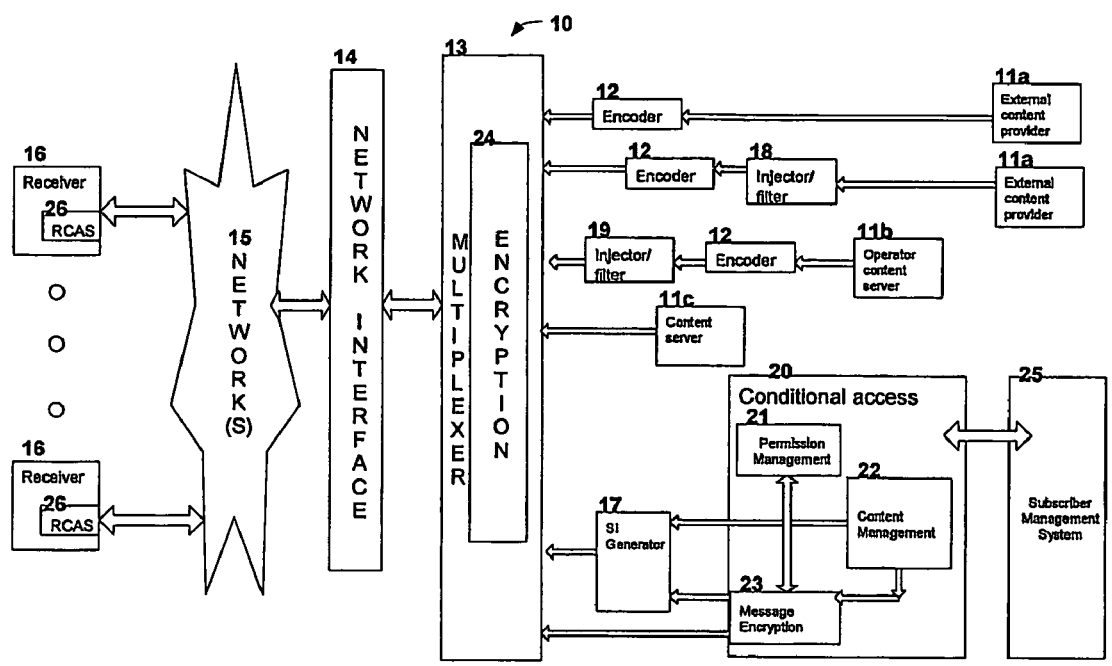
FIG. 1 is a block diagram illustrating functional components of a content delivery network.

The description which follows, and the embodiments described herein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

In an embodiment of the present invention, there is provided a method and system for detecting unauthorized signal usage in a wireless or wired signal distribution environment. The method of the present invention can determine whether unauthorized usage of signal is taking place even when network and receiver based security systems, as previously described, have been compromised in a manner that permits unauthorized access to one or more signals. As an option, once unauthorized signal usage is detected, the embodiment may directly or indirectly hinder or prevent usage of one or more features or signals by the receiver or another component in the network 10.

Distribution Networks and Receivers

Referring to FIG. 1, a content delivery network 10, such as for digital cable or satellite television, is described. The content delivery network 10 will hereafter be referred to network 10. The following details of the embodiments are mainly focused upon delivery of signals associated with television, but it will be appreciated that other content may be delivered in other embodiments.

Components of the network 10 may reside on a single physical system or on separate systems linked by one or more communication networks. Multiple instances of each component may also be required. Network 10 may include a plurality of content providers 11 for the content being delivered therein, such as external content providers 11a and internal content sources 11b, which are acquired or stored by the network operator. The content may consist of audio, video, data, applications, or any combination thereof. Depending on conditional access control as described below, the content is made available to receivers 16 in network 10 as determined by an operator of network 10 or by request from a user of receiver 16. The content may be broadcast or transmitted on a point-to-point, point-to-multipoint or other basis as is known in the art.

Examples of content streams include television signals with audio, video, closed captioning and interactive applications that may be embedded into a composite signal, as is the case with a television signal supporting the Wink™ or WebTV™ interactive television specifications. Content streams may also be a series of separate digital transport streams for audio, video, interactive television, and conditional access.

A given instance of content may be shared by one or more services. For example, an English language service may be defined as containing a given video stream and an English-language audio stream. A Spanish service may be defined using the same video stream and a Spanish-language audio stream. In this manner, only the bandwidth of one video stream is used on network 10 while two separate channels may be provided on a program guide.

Content may be received in a format that is compatible with the network 10, or may require processing before transmission within network 10. Examples of processing include compression and encoding for video and audio signals, format conversion, and encryption or the signals. Content may also be available from one or more content servers 11c operated by the operator of network 10. Content from content providers 11 may be transmitted in real-time, or slower or faster than real-time for purposes of caching content for deferred viewing at the receiver 16 or other downstream device.

Content from content providers 11 may flow into encoders 12 which process the content prior to distribution to a multiplexer 13. Alternatively, for content that is already encoded, it may flow directly into multiplexer 13. Content from multiplexer 13 may then be delivered through a network interface 14 to communication network 15 for delivery to a plurality of receivers 16. The function of multiplexer 13 varies with the network and content type, and format of the content. Examples of multiplexers 13 that may be used include MPEG-2 multiplexers, asynchronous transfer mode (ATM) packet switches, gigabit Ethernet devices, and other switching, networking or multiplexing systems known in the art.

Network 10 may provide multiple facilities for communication between receivers 16 and other components of network 10. As examples, on a cable television network, bandwidth may be allocated separately for content transmission, control signal transmission, and return communication from a receiver 16 with all communication occurring on the same cable. On a satellite television system, the content and control signals are transmitted over the satellite, while receiver 16 may communicate back to components of network 10 through a telephone connection.

Along with content from content providers 11, various forms of data may be transmitted to aid the viewer in the use of a multi-channel, multi-service system. This type of information, which can include the electronic program guide and related tables for access, frequency and other information for receiving and describing the signal, are referred to as service information (SI) tables. SI tables may be produced and transmitted by SI generator 17, and may also include various forms of control information from external sources to control access for content such as subscription services and pay-per-view movies, and other forms of information the content of which may be used by receiver 16. Signal enhancements such as station logos, data, and other forms of content may be included with the content from the various sources, may be added to or removed from signal associated with the content by injector/filter 19 that may be performed before or after the encoding process. As an example, injector/filter 19 is shown in FIG. 1 as performing signal enhancements after the encoding process of content from operator content server 11b.

Security and authorization of receiver 16 to use signals in network 10 may be provided by a conditional access system 20 (CA). CA 20 controls which content a particular receiver 16 is authorized to access. Services and functions provided by CA 20 include, among other things, permission management 21 for control of authorizations of a per user or receiver basis, content management 22 for controlling access to content, message encryption 23 facility to secure the communication authorization and other messages for transmission. CA 20 operates in conjunction with content encoder 12 for protecting of the content during transmission from unauthorized access, and a receiver conditional access system 26 (RCAS) at receivers 16 for communication with CA 20. RCAS 26 may include local secure storage of permissions and other content access information. Content encoder 12 may perform various transformations on all or part of the content signal to prevent unauthorized access, including signal modification, encryption, and other methods as is known in the art.

Subscription control of CA 20 may be managed by entering service authorization and cancellation commands on a subscriber management system (SMS) 25. SMS 25 forwards subscription control requests to CA 20, which may then generate the appropriate commands and operations to deliver subscription control commands in the form and manner required to be accepted by a receiver 16.

With respect to communication network 15, for a typical cable television system, communication network 15 may be a system of amplifiers, transmitters, re-transmitters, copper cable, fiber optic systems, switches and routers used for distribution of a signal in communication network 15, as is known in the art. In a cable television network, receivers 16 are connected to communication network 15 and may communicate back with an operator of communication network 15 using Internet, DAVIC (Digital Audio Video Council, Geneva, Switzerland), other command protocols supported by the communication network 15, or a combination of such protocols.

Other examples of communication network 15 include DTH (direct to home) satellite, microwave multichannel multipoint distribution service (MMDS), local multipoint distribution system (LMDS) television distribution system, DSL (Digital Subscriber Loop) and its various high-speed variants such as VDSL (as used, for example, by telephone companies for high-speed data and video transmission), ATM (Asynchronous Transfer Mode) networks, cellular telephone and other communication networks for transferring data as is known in the art.

Figure 2:
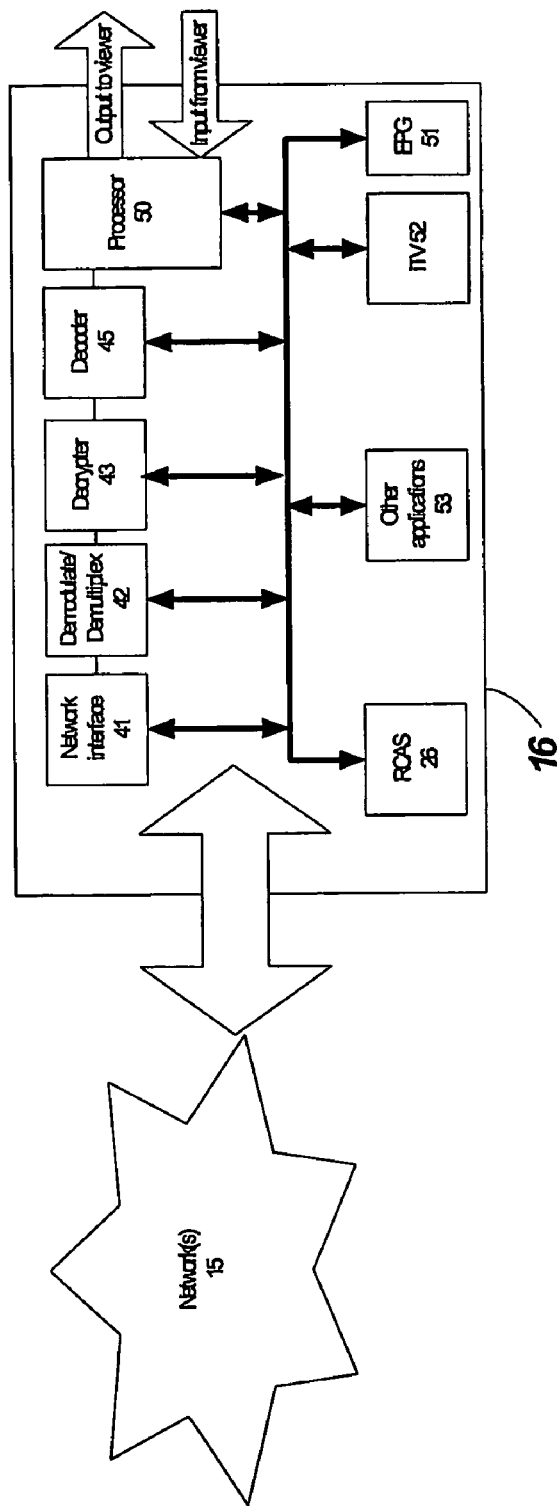
FIG. 2 is a block diagram illustrating the functional components of a receiver in the network of FIG. 1.

Referring to FIG. 2, some of the functional components of receiver 16 that may be found in typical digital television applications on network 10 are shown. Components of receiver 16 may be implemented in hardware or software, and individual or groups of functions may be provided by separate applications communicating through an operating system or other shared facility, or may be part of a single application, as is known in the art.

Receiver 16 includes one or more network interfaces 41 for communication to and from communication network 15. In an embodiment for a television receiver, network interfaces 41 may consist of one or more tuners to receive a signal from communication network 15, and a modulator or a telephone modem for returning data to communication network 15. Receiver 16 may further include demodulate/demultiplex function 42 to convert modulated signals received from network 15 into digital data, and extract the desired data from the signal stream. A decrypter function 43 performs decryption functions on the signals, and is typically controlled by RCAS 26 for controlling unauthorized use and access. The decryption of decrypter function 43 may be based on analog or digital means of preventing unauthorized access to the signal. Within receiver 16, decoder 45 transforms the signal's decrypted bits into a content format required by a user to receiver 16, such as a television viewer. For example, decoder 45 may convert the bits from MPEG digital audio and video bit streams into analog television signals.

RCAS 26 may typically be included in receiver 16 which controls the content that may be accessed and used at receiver 16. Examples of control mechanisms include channel subscription authorizations received from CA 20, and pay-per-view purchases made at receiver 16. In some embodiments, RCAS 26 can determine whether access is allowed through its own locally stored parameters, or by making an authorization check with CA 20. RCAS 26 may also provide additional functions for implementing or controlling the decryption process by decrypter 43 such as controlling the reception and processing of data, or providing decryption keys or other information required for controlling the decryption or access processes at receiver 16.

One or more processors 50 may be used to implement the functions of receiver 16 or to provide or control communication between the various functions of receiver 16. The functions and facilities of receiver 16 may further be controlled by an operating system and one or more software modules that execute on the one or more processors 50.

Other functions that may be available on a receiver can include an electronic program guide (EPG) 51 to allow a user to list, select and obtain other information on the content available; an interactive television (iTV) subsystem 52 to provide facilities for executing other applications such as games, viewer response gathering and other functions. These iTV applications may operate in conjunction with television programs received at receiver 16, or independently as separate services. System applications 53 may include system configuration, audience measurement, advertising management and other functionality. Advertising management systems may include systems for presenting or substituting advertisements, and presenting advertisements in a targeted manner based on viewing habits, user demographics or other criteria. Advertising management system may also include the ability to capture usage data such as time and date of channel viewing. Applications such as EPG 51 and the other applications may in turn be iTV applications that use the facilities of iTV subsystem 52. In the embodiment, system applications 53 may also include capabilities for exercising some control over what may be viewed through receiver 16, such as parental control and copy protection. These and other applications may in turn require additional processing of an accessed signal by network components that may be implemented in one or more of the injector/filters 18 or 19, content spooler 11c, CA 20, SI Generator 17, or component, data or other signal information.

Multiple instances of each functional component may be available on a particular receiver 16. Thusly, simultaneous processing of multiple signals is possible, and the ability to handle different signal types is also provided. Examples include the ability to process multiple television signals at a time for picture-in-picture functions, to record one program while watching another on a receiver equipped with a personal video recorder (PVR) feature, and to receive analog and digital signals.

Functions and applications may be provided and managed in multiple ways on receiver 16. The applications may be part of the software provided with receiver 16, and included with receiver 16 when it is shipped to a user or updated thereon after the user has put receiver 16 in use. Additionally, one or more separate binary applications may be transmitted separately to receiver 16 through communication network 15. Further, interpreted applications may be executed within an iTV environment. The iTV applications may be considered separate content provided in network 10, or may be included with video or other content as optional enhancements. Transmission of an application may be managed as a separate content stream or as a component of another content instance such as video program.

In alternate embodiments, receivers 16 may include any and all of the following operating alone or in combination: digital set-top cable and satellite receivers; integrated components within digital televisions; personal computers with appropriate network connections; cellular telephones and personal digital assistants (PDAs) connected through wireless networks or computer network hook-ups; and gaming consoles. Such receivers 16 typically rely on CA 20 having one or more capabilities similar to those used in television transmission, including satellite and other digital radio systems, mobile telephones using chip-card technology, and mobile or home devices and related services for receiving music, video or other content that receive content either directly from a network or indirectly through a computer such as the iPod™ music player and iTunes™ music service.

Receivers 16 may have the ability to receive software updates and applications through communication network 15. In television and other receivers, these applications do not necessarily require interaction with the user, as they may execute in the background without the user's knowledge or during the receiver off state.

Receivers 16 may also include one or more application execution environment to receive and execute scripts or compiled or interpreted applications. Examples include various Java™ systems such as Personal Java™, Java™ and others, as implemented in computers, web browsers and other devices. For embodiments receiving television signals, application execution environments of receiver 16 include iTV products and specifications such as WebTV™ and MSN™TV services, the Wink™ and OpenTV™ systems, and specifications such as DVB-MHP from the DVB Project, and OCAP (Open Cable Application Platform) from the Society of Cable Telecommunications Engineers (SCTE), and others. Other applications, such as an EPG, an audience measurement application, an advertising management system, or others may be implemented as applications within an application execution environment, or may include an application execution environment which may provide similar capabilities to an iTV system for running interactive or background applications. Additional systems with similar capabilities for receiver 16 are known in the art.

In an embodiment for distribution of television signals in network 10, whether using analog, digital or a combination of both technologies, network 10 and receiver 16 typically rely on the encryption and access control components provided in network 10 and CA 20. Such components control which receivers 16 have access to particular content and signals in network 10, whether in the form of specific viewing channels, program selections, or other features available to the subscriber such as interactive applications. Examples of these security systems that may be implemented include the Simulcrypt specifications developed by the DVB Project, Geneva, Switzerland, conditional access systems and smart cards from Nagravision SA, Cheseaux, Switzerland, and NDS Group plc, Middlesex, UK, and the conditional access subsystems of the DigiCipher™ II products from Motorola, Inc., Schaumburg, Ill., and the PowerVu™ products from Scientific-Atlanta, Inc. Lawrenceville, Ga. Other systems for controlling or facilitating access have been implemented, which systems include applications for parental control methods such as the V-Chip technology offered by Tri-Vision International LTD, Toronto, Canada, the electronic program guide (EPG) products offered by Gemstar-TV Guide International, Inc., Los Angeles, Calif., and video copy protection products from Macrovision Corporation, Santa Clara, Calif.

As previously described, security and authentication of access may be provided by CA 20 and other components at the site of the operator of network 10 (such as encoders 12) and within receivers 16, as described above with reference to FIGS. 1 and 2.

CA 20 communicates authorizations to access and use signals to RCAS 26 located on each receiver 16. Receiver 16, RCAS 26, or a component or subsystem peripheral to RCAS 26 such as a smart card, typically has one or more identifiers. These identifiers, alone or in combination, may identify receiver 16 in network 10, and may be used by CA 20 or other systems to communicate with and send authorization commands to RCAS 26 or other components or subsystems of receiver 16. These authorizations are typically based on transmitting one or more authorizations periodically to a receiver 16; upon receiver 16 requesting access to a specific service or a list of authorized services from CA 20; or, for services such as pay-per-view movies, on a credit scheme where the credit is transmitted to or provided with receiver 16 and the credit is reduced through usage of pay-per-view content at receiver 16. In a credit scheme, the credit may be based on a financial amount (dollars), a number of tokens or other methods that are known in the art The credit may be provided by SMS 25 that may be separately accessed by a user of receiver 16 (such as by telephone orders to SMS 25). In such an embodiment, the authorization request and related credit information to is typically provided by SMS 25 to CA 20 for processing and transmission to receiver 16. Examples of SMS 25 include systems such as those provided by DST Innovis, Inc., El Dorado Hills, Calif., CSG Systems, Incorporated, Englewood, Colo., and others.

Detecting and Preventing Unauthorized Signal Usage

Figure 3:
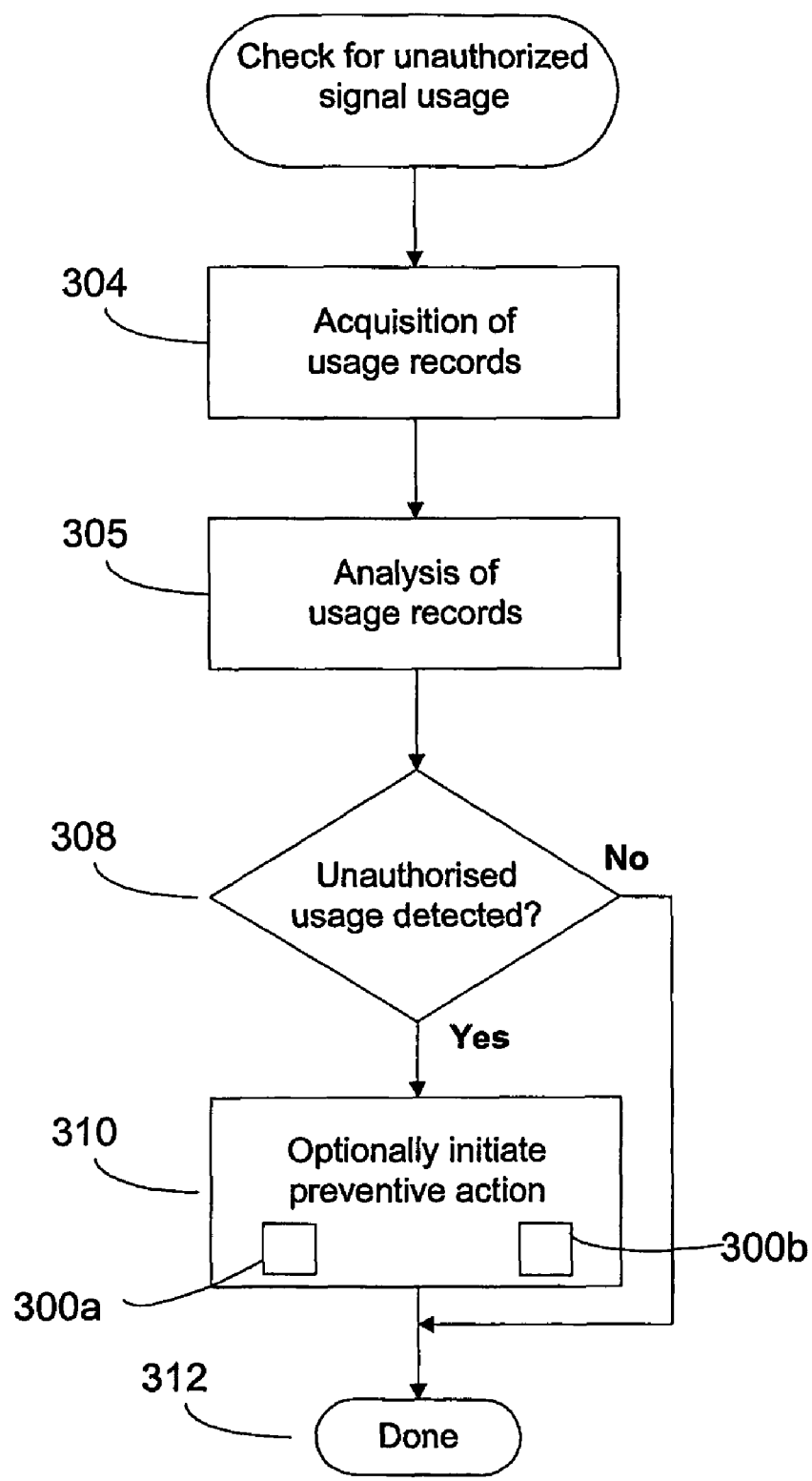
FIG. 3 is a flow diagram for detecting unauthorized signal usage in the network of FIG. 1.

Referring to FIG. 3, a flow-chart of a method for detecting and preventing unauthorized signal usage in network 10 is shown. Briefly, the steps of the method include the acquisition of one or more usage records 100, and evaluating the usage records 100, to determine if unauthorized signal usage has occurred. If unauthorized signal usage is detected, then optional initiation of preventive action, including disabling of a particular receiver 16, is taken.

In an embodiment, the method detects unauthorized signal usage at a receiver 16 by way of comparing combinations of signal usage records to behaviours that are consistent with unauthorized signal usage.

The steps of acquiring usage records 100, evaluating such usage records 100, and disabling receiver 16 may all be performed by receiver 16, by CA 20, or by one or more components throughout network 10, as explained in greater detail below.

In greater detail now, at step 304 the acquisition of usage records 100 is performed to acquire one or more records of signal usage. In one embodiment, record 100 may comprise an identifier for the current content being used on receiver 16, which, for example, in the context of television signals, may be the channel number or another code identifying the channel being viewed through receiver 16.

Depending on the capabilities of receiver 16 and the functionality available within receiver 16, one or more function calls, memory or register accesses, data access or other method of accessing data, or combinations thereof, may be used to acquire data for signal usage record 100, as explained in greater detail below. Usage record 100 generically refers to any record of signal usage at a receiver 16 that is available or kept, and it may contain data such as a channel identifier, blackout information to control the geographical or other locations that are authorized to view a particular program, the date and time of the content signal usage, information on the content used such as the program name, the schedule start time for the program, the time and date of the viewing, the content type for authorization purposes (subscription channel, pay-per-view event, or other characteristic), and other information that is available to one or more processes of receiver 16 or other components of network 10. The step acquisition of usage records 100 may also include storing usage records 100 for subsequent processing.

At any particular time, the current status of receiver 16 may be such that it contains multiple usage records 100. Examples of different records 100 include: the channel currently being viewed; the channel identifier stored to enable the "previous channel" feature that is accessible from may remote control devices; a channel in a "picture-in-picture" (PIP) window; the "previous channel" feature for the PIP window; and a channel being recorded in the background on a receiver with personal video recorder capability.

Usage records 100 may also be accessed from other subsystems of receiver 16, or from other components of network 100, such as CA 20, where usage records 100 may be stored. Additional details the acquisition of usage records 100 are described below.

After usage records 100 have been acquired at step 304, then at step 305 a step of evaluating usage records 100 is performed. Therein, analysis is performed on the one or more usage records 100 that were acquired to determine if unauthorized usage has occurred. In the embodiment, there are multiple tests and comparisons that may be used to detect if unauthorized signal usage has occurred, as described below. Then at step 308, if unauthorized signal usage is detected, step 310 is taken to optionally initiate preventive action, as described below. If unauthorized signal usage is not detected at step 308, then the detection process ends at step 312. The various detection methods that may be used by the embodiment at step 308 to detect unauthorized signal usage, through evaluating one or more usage records acquired for a receiver 16 against a predetermined signal usage indicator, are now described in detail.

Detection Method 1: Indicia of Usage of Unauthorized Combination of Signals and Indicia With respect to a first detection method, acquired usage records 100 may be compared in the embodiment to a predetermined signal usage indicator having indicia relating to combinations of signals normally unauthorized on any one receiver 16 to determine if a combination of the records 100 acquired from a receiver 16 are associated with services, programs or signals that are not normally authorized in combination on the receiver 16.

Examples of inconsistencies in combinations of channel usage indicative of unauthorized signal usage include the accessing through receiver 16 local stations from multiple communities on satellite television systems operated by different operators, such as the DISH Network from EchoStar Communications Corporation, Littleton, Colo., and DirecTV, from Hughes Electronics Corporation, El Segundo, Calif. These operators typically carry the local stations from multiple United States cities. A particular receiver 16 therefore would normally only be authorized to access and use local signals for the city or area in which a user of receiver 16 has registered a subscription with the particular operator. Another example includes accessing through receiver 16 cable and satellite television channels that are normally only authorized for viewing in certain geographical areas, such as the regional signals from Fox SportsNet™ from Fox Entertainment Group, New York, N.Y. In Canada, premium signals such as, for example, The Movie Network from Astral Media Inc., Montreal, Canada, may only be normally authorized for receivers 16 of subscribers in the eastern part of the country, and signals for Movie Central from Corus Entertainment, Inc., Calgary, Canada, may only be normally authorized for receivers 16 of subscribers in the western part of the country.

Unlike legitimate, authorized system users, users of a compromised receiver 16 may be able to view such combinations of signals that are not normally authorized for access for subscribers in a single area through any particular receiver 16.

As such, the use of such combinations of signals accessed at a particular receiver 16 may be used to detect unauthorized viewing through the receiver 16. Even without knowledge of the location of a receiver 16, the use at the receiver 16 of a first signal normally authorized only for a specific set of users and a second signal normally authorized for a second set of users that does not overlap with the first set of users is indicative that the viewer is not authorized for one or both of the signals and that unauthorized signal usage at receiver 16 has occurred.

As a further example, an operator of network 10 may offer channels 201 through 210 in only the eastern half of a country, and channels 211 through 220 in the western half of the same country, with the eastern and western halves of the country defined in a manner that does not include any overlap between the two. In this example, any receiver 16 whose usage records 100 indicate that channels within 201 to 210, and channels within 211 to 220 has been accessed by the receiver 16 may then be identified as having had unauthorized signal usage.

For such an example, the performance of such a comparison may take various forms, including a direct comparison between two services. Such a comparison may be performed by, for example, a processor 50 in receiver 16 by execution of software code. In other embodiments, the comparison function may be implemented in other combinations of hardware or software, by other components or combination of components in network 10. As an example, the following pseudo-code may be used to implement an exemplary comparison:

```
if record1.channel = 201 and record2.channel=210
    then unauthorized_usage = true
```

Further, a test may also include ranges of channels

```
if ((record1.channel >= 201) and (record1.channel <= 210))
    and ((record2.channel>=211) and (record2.channel <=220)
    then unauthorized_usage = true
```

Additionally, the comparison or test may refer to one or more data structures, bit maps, lists, arrays, files or other structures accessible to a process that would list the incompatible services for a given channel. The test may perform a lookup from such a structure to determine if a given pair of channels is incompatible. In this example, such a list that includes channels 211 through 220 is referred to as LIST_INCOMPATIBLE_201_TO_210, and function IS_IN (channel, list) would implement a list check, query or other function to determine if the specified channel is included in the list:

```
If ((record1.channel>= 201) and (record1.channel <= 210))
    then if IS_IN(record2.channel,
        LIST_INCOMPATIBLE_201_TO_210)
        then unauthorized_usage = true
```

In some embodiments, a set of instructions or processes can be directly associated with usage of a given service or signal. A process that is triggered by the usage of any one of channels 201 through 210 could simplify any of the preceding exemplary tests by removing the need to check record1, and the preceding example may then be simplified to:

```
if IS_IN(record2.channel, LIST_INCOMPATIBLE_201_TO_210)
    then unauthorized_usage = true
```

Generalized compatibility functions may also be used. For example, a function IS_CHANNEL_COMPATIBLE(channel1, channel2) could be implemented to check against one or more lists or other structures for compatibility between the two channels, as may be readily implemented by one skilled in the art. Other methods and data structures for comparing a pair of variables, a variable against a set of variables, or two sets of variables for performing a comparison test are also known to those of skill in the art.

As previously discussed, the performance of tests in the step of evaluating usage records 100 for detecting unauthorized signal usage may take place in various manners at various times, such as at the time of viewing, or may be executed at a later time based on logged viewing records. Details on the implementation, triggering and timing of test execution are described in greater detail below.

Figure 4:
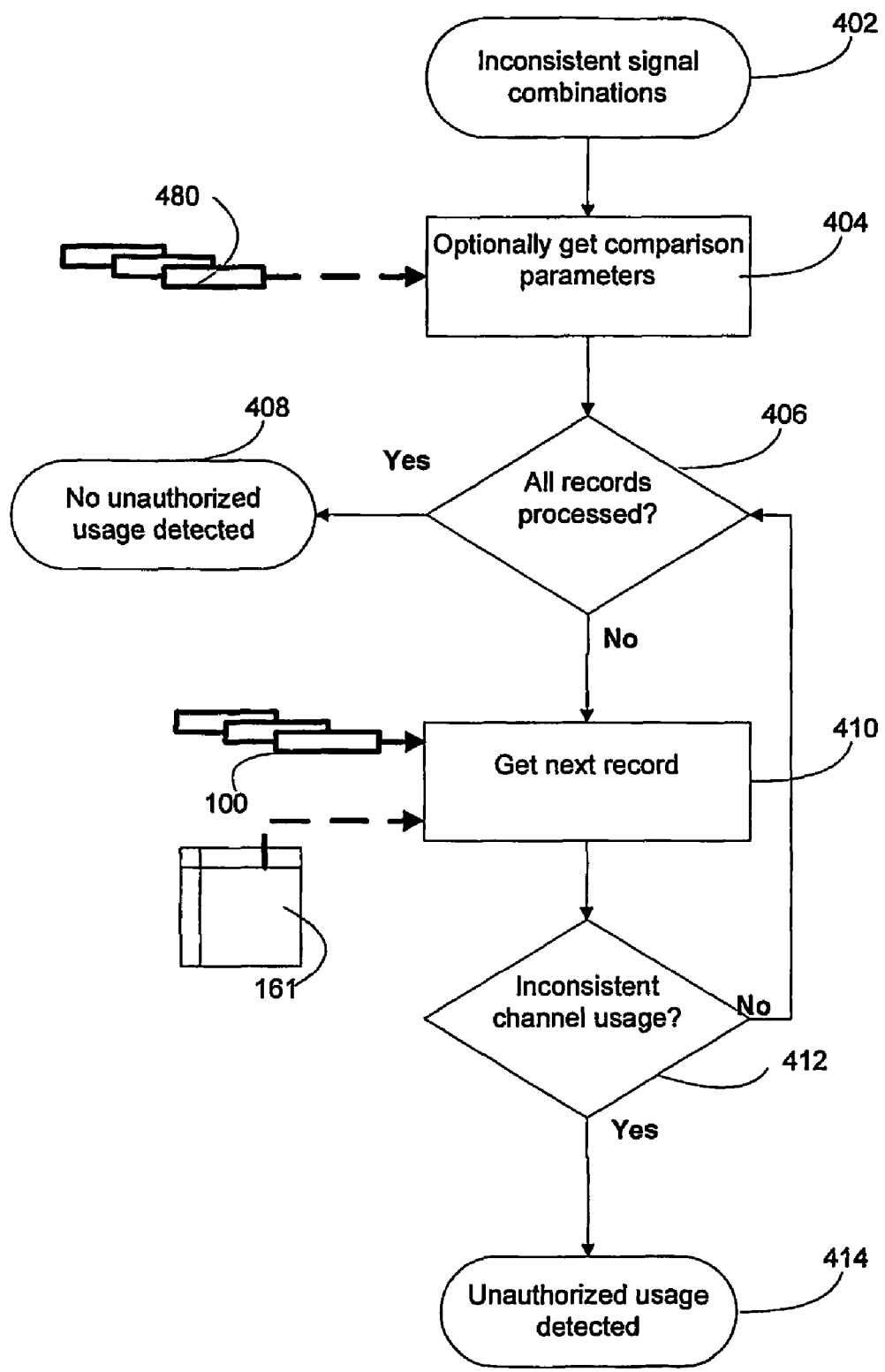
FIG. 4 is a flow diagram for detecting unauthorized signal combination usage in the network of FIG. 1.

Referring to FIG. 4, a flow-chart diagram of a detection method of the embodiment using the above describe test of inconsistent signal combinations is shown. The method shown on FIG. 4 describes a system in which checks are made against both the signal usage records 100 available from the current receiver state of receiver 16 and from a set of logged records 100. However, it will be appreciated that a check against records from either of the current signal usage records 100 or logged records 100 is sufficient.

In step 404 of FIG. 4, one or more parameters 480 may be retrieved from any one or more components of network 10 as indicia of unauthorized signal usage for evaluating usage records 100 against In addition to channel compatibility lists, matrices or other structures listed above, data and data structures can be used as indicia of unauthorized signal usage to generalize or limit the methods and processes for testing of unauthorized signal usage. For example, the tests described above may be limited to a specified number of records 100 or combinations of records 100.

Then at step 406, a signal usage record 100 is retrieved from the available records and evaluated. Typically, the analysis may start with the most recent record 100. At step 406, a check is performed to determine if all desired records 100 are processed. If so, then no unauthorized signal usage is determined to have taken place at step 408. However, if there are still other records 100 to process, then the next record 100 may be obtained at step 410 from any of the record storage structures created or populated by the acquisition of records 100 in step 304 described with reference to FIG. 3 above. In this example, both a usage record 100 from the most recent acquisition of records (or the current receiver state of receiver 16), and a usage record log 161 that is compiled by earlier instances of usage record acquisition, as described at step 304 described with reference to FIG. 3, are obtained for analysis. Again, it will be appreciated that either the current usage records 100 or the usage record log 161, or both, may be used at step 410. The process of obtaining a record 100 will depend on the storage structure used for the usage records 100 being accessed, and may be as simple as accessing a memory location or register.

One or more forms of the tests described above for inconsistent channel combinations described above is then implemented as step 412 for evaluating the one or more usage records 100 obtained in step 410. If unauthorized signal usage is detected, then the method proceeds to step 414 to identify such unauthorized signal usage and return operation to step 308 as described with reference to FIG. 3. If unauthorized signal usage is not detected at step 412, then the method loops back to step 406 to check if there is another desired record 100 to process.

The records 100 for the test of inconsistent combination of signals usage may be acquired in a variety of manners, with the manner chosen being relevant to determining how the method will be implemented. The following pseudocode samples are examples of some the possibilities implementing the acquisition of records and performing the test.

Firstly, one may code within the process of specific tests against one or more sets of one or more channels. In one embodiment, the process implementing the test is associated with one or more channels which are incompatible with another set of channels. For example, if a given set of channels are never authorized with channels 201, 202, 205, 206, 207 and 208, then the following set of instructions would provide detection of unauthorized usage for a program associated with the given set of channels:

```
/* Program is only run for channels that are incompatible with 201, 202, */
/* 205, 206, 207 and 208 */
for all records available
    if record.channel=201
        or if record.channel = 202
        or if (record.channel >= 205 and record.channel <= 208)
            then unauthorized_usage = true
    next record
end for
```

One may also check against combinations for multiple channels or content instances. For example, if channel 201 is never authorized with channels 203 or 204, and channel 300 is never authorized with channel 301, the following process could be run on the receiver for any channel of content access:

```
first_record = get_record( )          /* get the first record */
while more records available
    next_record=get_record( ) /* get the next record */
    if first.record.channel= 201 and
        (next.record.channel=203 or next_record.channel=204)
        then unauthorized_usage
    if first_record.channel=300 and next_record.channel=301
        then unauthorized_usage = true
end while
```

Additionally, in embodiments where logging of usage records 100 is not used, the tests can occur against the limited set of records available to the process. For example, in an embodiment where only the current and previous channels are available, the steps of processes 304 and 305 of FIG. 3 may be implemented as follows:

```
/* Step 304 */
current_channel=get_current_channel( )
prev_channel= get_prev_channel( )
/* Step 305 */
if ((current_channel = 201) and (prev_channel=203 or
    prev_channel=204))
    or ((current_channel=300) and (prev_channel=301))
    then unauthorized_usage = true
```

Where a process is attached to one or more specific channels with a common set of incompatible channels, the process may be further simplified. In the previous example of channel incompatibilities, channel 201 is incompatible with channels 203 and 204. The following process could be associated with channel 204:

```
/* Step 304 */
prev_channel=get_prev_channel( )
/* Step 305 */
if prev_channel=201
    then unauthorized_usage = true
```

In alternate embodiments, the determining of whether channels are compatible and consistent with authorized signal usage may include the use of one or more structures such as arrays or matrices. Such structures may be stored within the process executable: as data structures, files or other storage or transmission mechanisms accessible to the processes as optional parameters 480 as acquired in step 404 described with reference to FIG. 4. In an iTV implementation, the processes and data files containing the list of incompatible channels could be transmitted within the iTV streams. As an example of such a data structure, a matrix is provided as a file that is transmitted within an iTV stream that is accessible to an iTV process. In one example of such a structure, one index of the matrix may be an individual channel identifier, or a range or set of channel identifiers, and the other index of the matrix is the set of incompatible channel identifiers, ranges or sets of channel identifiers. It will be appreciated that there are other methods for comparing whether two channels are compatible. Additionally, various techniques may be used to reduce the number or rows and columns in the bit map by only representing rows and columns for channels that are to be tested for compatibility.

Detection Method 2: Indicia of Usage of Unauthorized combination of Signals and Blackout Indicia In a second detection method of the embodiment to implement step 308 described in FIG. 3 with respect to detecting unauthorized signal usage, this method utilizes indicia of signal usage behaviours associated with a combination of programs or signals that has been used when such a combination of signal use would normally have been prevented through a mechanisms to control access to the signals in different geographic locations. For example, if a program A is only available to viewers in New York state, and a program B is only available to viewers in California, a receiver 16 that has been used to access both programs A and B can be determined to have engaged in unauthorized signal usage, regardless of the actual or intended location of the receiver 16.

In an implementation of network 10, an operator may use blackout zones to control access to signals (such as for viewing of programs), blackout zones are typically used for sporting events, where the rights associated with television distribution of the event forbid the showing of the program in one or more geographical areas. For a given operator, one or more blackout zone configurations may exist on a network 10, each of which divides the viewing area into sections. As an analogy, a given blackout zones configuration is like a jigsaw puzzle of the entire geographic viewing area for the operator of network 10, and each blackout section is a piece of the puzzle. Typically, blackout sections, like pieces of a puzzle, do not overlap, and each receiver 16 is located within one and only one section for each blackout configuration. For a given program or channel, a blackout zones definition will control which blackout sections of the viewing area are permitted or forbidden from watching a program or receiving a particular signal.

As such, another method for determining inconsistent channel usage may be to compare usage records 100 of two or more separate programs, or of two or more signals, to determine if any combination of viewed programs or accessed signals were subject to blackouts that would not normally permit viewing or access of the signals in combination in the same geographical area. Advantageously, this method may be used to detect unauthorized signal usage without knowing the specific location of a receiver 16 or the blackout configurations and sections that should be applicable to each particular receiver 16.

Testing for indicia of incompatible signals for a given signal based on program blackout information may be implemented in several ways, including by way of software modules being executed on processor 50 of receiver 16. Coding may be done within a process of specific tests against one or more sets of one or more channels or programs. For instance, assume that the process implementing the test is associated with one or more channels or programs which contain blackout information. For example, if a given set of blackout sections named 2001, 2002 and 2003 each identify areas that can each separately view programs covered by blackout zones that are not allowed in the other sections, then the following set of instructions provides detection of unauthorized usage for a program associated with the above set of blackout sections. In this example, a usage record 100 for a channel or program which is governed by blackout zones control contains information on the applicable blackout configuration section or sections that are allowed to view a program or access the signal in question.

The following pseudocode is one example of an implementation:

```
blackout2001=0
blackout2002=0
blackout2003=0
for all records available
    if record.blackout_section=2001
        then blackout2001=1
    if record.blackout_section=2002
        then blackout2002=1
    if record.blackout_section=2003
        then blackout2003=1
blackout_sum = blackcout2001 + blackcout2002 + blackcout2003
    next record
end for
if (blackcout2001 + blackcout2002 + blackcout2003) > 1
    then unauthorized_usage = true
```

Implementation of this second detection method of the embodiment may be structured in a similar manner to that described with respect to the first detection method described above, with minor modifications as will be apparent to one skilled in the art. For example, similar data structures and lists may be used to identify incompatible blackout patterns. As with the tests described above, the test may refer to one or more data structures, bit maps, lists, arrays, files or other structures accessible to a process that would list the incompatible services for a given blackout pattern. The process could perform a lookup from such a structure to determine if a given pair of blackout patterns is incompatible. In the example above, such a list that includes blackout zones incompatible with other blackout zones may be referred to as LIST_INCOMPATIBLE_BLACKOUT_2001, and function IS_IN(channel, list) would implement a list check, query or other function to determine if the specified blackout pattern is included in the list:

```
If (record1.blackout = 2001)
    then if IS_IN(record2.blackout,
        LIST_INCOMPATIBLE_BLACKOUT_2001)
        then unauthorized_usage = true
```

The examples described above use the blackout zones system as the determinant of incompatible geographical location for a signal use. While the blackout control mechanism appears to be the predominant mechanism in deployment today for geographical control of viewing signals, it will be appreciated that other mechanisms used to geographically control the availability of programs could be accessed by alternate embodiments to identify unauthorized signal usage.

Using similar mechanisms as that described above with respect to the first detection method of the embodiment to retrieve viewing records and data, blackout zones information on programs and signals may be accessed for use in the analysis processes of the second detection method of the embodiment.

Detection Method 3: Concurrent Usage of Multiple Pay-Per-Usage Signals

Figure 5:
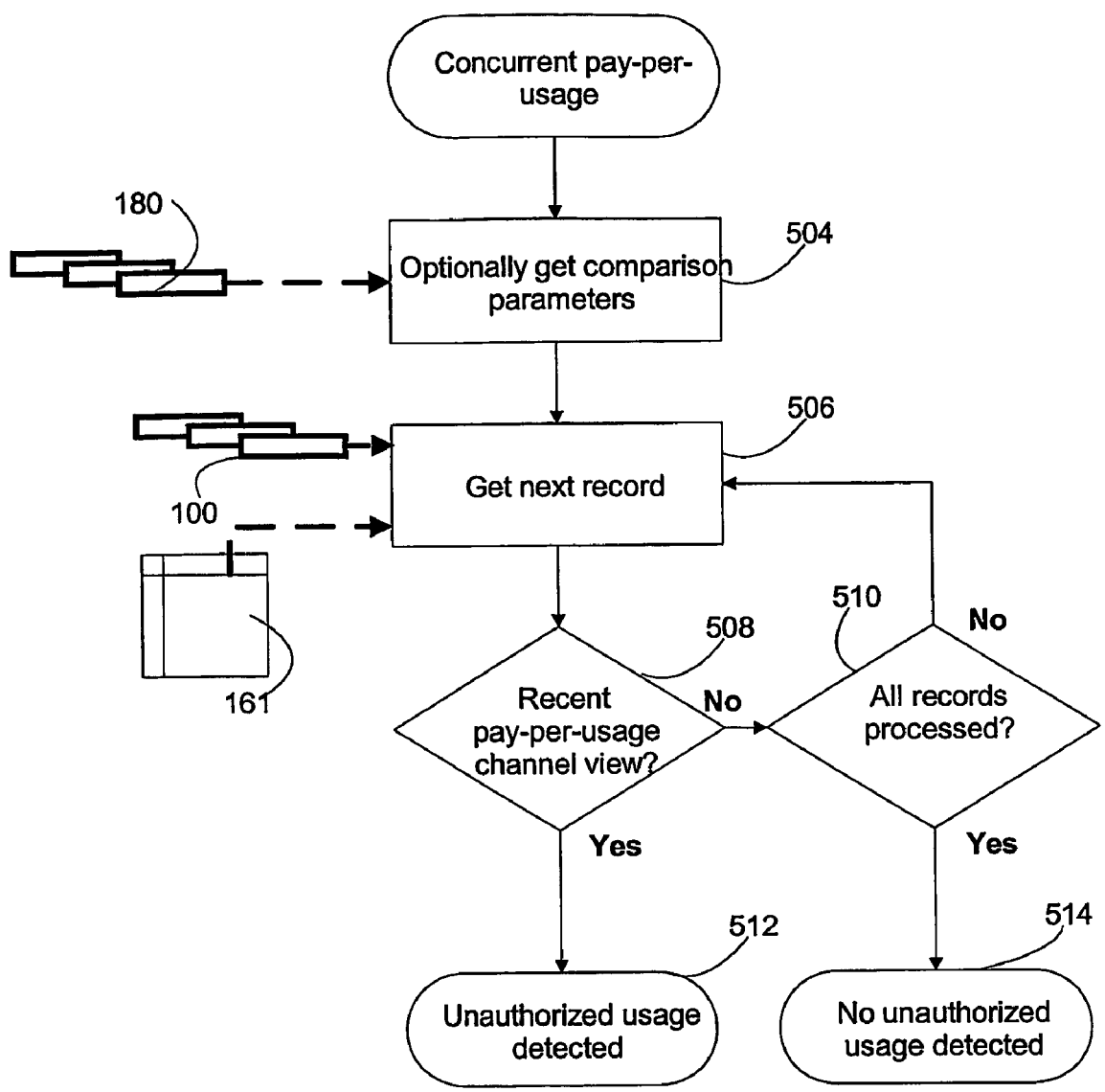
FIG. 5 is a flow diagram for detecting concurrent pay-per-usage signal usage in the network of FIG. 1.

Turning now to a third detection method usable, a flow-chart diagram of analysis of signal usage records 100 for indicia of usage of multiple pay-per-usage signals within a pre-determined time period for detecting unauthorized signal usage is shown in FIG. 5. Pay-per-usage is also typically referred to as pay-per-view (PPV) in television environments.

Typically, a pay-per-view signal has a purchase cost associated with its usage through a particular receiver 16, and a user of the receiver 16 must agree to pay this cost as part of the pay-per-view purchase process. Due to this cost, a television viewer is unlikely to purchase multiple pay-per-view events which are shown at the same time, and thus, it is unusual for channel switching or "channel surfing" between multiple pay-per-view programs or other channels to occur at any particular receiver 16.

When a security system of a receiver 16 is compromised, a user of that receiver 16 may be able to watch multiple pay-per-view channels without accepting or paying the charges normally associated with the pay-per-view programs. The viewer's behavior may therefore change, as the viewer may now elect to "channel surf" between pay-per-view channels and other channels. "Channel surfing" between pay-per-view channels may therefore be used as indicia of unauthorized signal usage.

This third detection method of the embodiment therefore identifies unauthorized signal usage by identifying "channel surfing" between pay-per-view channels as the near-simultaneous use of two or more pay-per-view signals. The determination of near-simultaneous use may be made through different means. For instance, usage records 100 that are logged with the time of viewing may be used. Unauthorized signal usage may also be determined if the signal usage records 100 of a receiver 16 show two or more pay-per-view signals were used within a pre-determined period of time. Alternatively, the third detection method may use two or more usage records 100 from the current state of a receiver 16, such as the current channel, the previous channel, a picture-in-picture channel, a previous channel for picture-in-picture, or a channel being recorded within a PVR device, to determine if there is simultaneous pay-per-usage signal usage. If two or more of these records are for pay-per-view signal usage, then unauthorized signal usage may be determined to have occurred.

Tests for concurrent use of multiple PPV signals may be made based on the actual concurrent usage of signals, or on signals used within a defined period of time that is short enough for the operator of network 10 to judge that unauthorized viewing has occurred. For example, on a basic receiver 16, only one channel or signal may be used at a time. In such a case, the usage records 100 may be limited to the current channel and the channel from the "previous channel" feature. If both the current and previous channels are PPV channels, then unauthorized usage may be deemed to have occurred by the operator of the network 10 on which the receiver 16 is located.

Where a log of prior usage records 100 is available, a timestamp within the record 100 may also be used in the assessment. For example, a period of time for the method may be controlled by a parameter X which indicates a number of time units, and a number of uses of PPV content that is used to indicate unauthorized usage within the X time units can be controlled by a parameter Y, where Y is typically set to two or higher.

As an example, on a receiver 16 with picture-in-picture functionality, a function IS_PPVO may be implemented to return a value of TRUE if the current program is a PPV program and the picture-in-picture functionality is also set to a PPV program, then the test can take the pseudo-code form of:

```
IF IS_PPV(channel.main) and IS_PPV(channel.picture_in_picture)
    THEN unauthorized_usage = TRUE
```

Other tests or combinations of tests may be included for use with the various usage records 100 available will be apparent to those skilled in the art. Further, it will be appreciated that other logic and methods for testing between a set of values from two or more usage records 100 may be used in other embodiments.

As is the case for the first and section detection methods described above, the third method of the embodiment may be implemented within the step 412 of checking for inconsistent channel usage described above with reference to FIG. 4. In such a case, the time units X and/or the number of channels Y may be defined in the test or may be obtained from parameters 480. As an example of one implementation in an embodiment, the test could be implemented against a set of records as follows:

```
/* Looks for records of PPV within X seconds of the current time, */
/* identified as time(NOW), with functions diff_time( ) returning the */
/* number of seconds between two times */
PPV_Count = 0
start_time = time(NOW)
for all records available
    if diff_time(start_time, record.time) <= X and
    IS_PPV(record.channel)
        then PPV_Count = PPV_Count + 1
    next record
end for
if PPV_COUNT >= Y
    then unauthorized_usage = true
```

It will be appreciated that other implementations may be used in other embodiments. For example, the test could omit the IS_PPV(record.channel) component of the test if only PPV usage records 100 are logged. The time tests could be based on the difference in time between a set of records 100, or finding a set of records within a given time interval.

In other embodiments, features of an electronic program guide EPG or other tool used to assist in program selection at receiver 16 may be used to detect concurrent pay-per-use signal usage or to obtain viewing records for the other methods of the embodiment described herein. As an example, EPG functions may be presented with picture-in-picture capabilities; depending on the capabilities of a receiver 16. EPG may be able to present on display connected to receiver 16 video or still images from two or more channels currently playing. If the EPG is able to display video or still from multiple PPV channels, then unauthorized signal usage is deemed to have occurred. This acquisition of usage records 100 from a multi-channel EPG display can also be used as a source of records for the other unauthorized signal usage detection methods described herein. In such a case, each channel for which video or an image can be displayed could be considered a current signal usage record 100. These EPG related records 100 could be used as a self-contained set of records for the test, or could be combined with records 100 from the receiver state of receiver 16 and/or prior usage records 100. For example, the test for detecting unauthorized signal usage may be incorporated within the EPG presentation logic to the number of video or still windows presented from PPV channels within the EPG page. This counter could be used independently or along with other receiver state or logged records make a complete count of the number of PPV channels considered as being concurrently viewed through receiver 16. In some embodiments, EPG functions may include a "favourite channels" menu that is configured in accordance with the signal use habits of a use of receiver 16. It will be appreciated that such a favourite channels menu, or other multi-channel display menus, may also be used in embodiments to detect concurrent pay-per-use signal usage.

Referring to FIG. 5 a flow chart shows, usage records 100 being compared to determine if they indicate near-simultaneous use of multiple pay-per view signals. As shown, parameters 580 relating to indicia of unauthorized signal usage indicating near-simultaneous use of multiple PPV signals is retrieved at step 504. Thereafter, at step 506 a usage record 100 representing the current state of receiver 16, or set of usage record logs 161 is retrieved. Then at step 508, usage record 100 or record log 161 is analyzed as described above for indicia of near-simultaneous use of multiple PPV signals. If such indicia is found, then the method proceeds to step 512 to conclude that unauthorized signal usage occurred at the receiver 16. If there was no indicia of near-simultaneous use of multiple PPV signals at step 508, then step 510 is taken to determine if there are other records 100 which are desired to process. If not, then the method proceeds to step 514 to declare that no unauthorized signal usage is detected. If additional records 100 are to processed, then the method returns to step 506 to get the next record 100 or log 161.

To process step 508, one may potentially require more than just the channel number for each usage record 100, as multiple pay-per-view events can be scheduled on the same channel, and certain events on pay-per-view channels may not in fact be pay-per-view events. Step 508 may therefore preferably require a check that the program identified in the usage record 100 is a pay-per-view program, that the program has a cost associated with it, or alternatively, the program may have an identifier or other information to indicate that the program is a pay-per-view event.

Implementation of this third detection method of the embodiment is similar to that described above with respect to first and second detection methods, with minor adjustments as will be apparent to those skilled in the art.

Detection Method 4: Unauthorized Combination of Program and Location Indicia

In a forth detection method of the embodiment, the use of one or more signals intended for a given geographical area may be compared against one or more indicia of a usage record 100 that may be used to derive the intended location of a receiver 16 to provide indicia of unauthorized signal usage. For example, data pertaining to the time zone in which a receiver 16 is intended to operate, or a current time can be used as an indicator of geographical location for the receiver 16. For example, receiver 16 that has an indicator for Eastern Time zone and that is utilizing a signal that is normally only authorized for a western time zone may be used as indicia that the receiver 16 is operating in an unauthorized manner. Other examples of indicia that may be available in a receiver 16 to indicate its intended location include location codes such as a US Postal Service ZIP code; one or more blackout zone indicators as typically used to control viewing areas of sporting events; and other data that may be sent specifically to a receiver 16 to indicate the location thereof. Some types of receivers 16, such as mobile phones, may include Global Positioning System (GPS) subsystems or other mechanisms to determine the location of a receiver 16. Any such information described above relating to the identification of the location of a receiver 16 may be referred to as geographic locator information. Using this geographic locator information, the geographic location of a receiver 16 may be determined. Indicators of the intended geographical area for a given program or channel may include blackout zone definitions as described earlier, authorization procedures and rules that normally only allow programs to be authorized for receivers 16 in specific geographical locations. It will be appreciated that other mechanisms for determining geographical location may be used in other embodiments.

For the fourth method of detecting unauthorized signal usage, its operation is very similar to that described for the third method with reference to FIG. 4. However, for this fourth method the "get next record" step of 410 and the test for all records processed step of 406 may be omitted if only the usage record corresponding to the currently used signal at receiver 16 is to be tested against one or more indicia described above. The test for inconsistent channel usage under this fourth method would test a record 100 against a value or range of one or more indicia For example, if the usage record 100 is associated with a local channel from Los Angeles, the method may check if a ZIP code stored within the record 100 is within a range of ZIP code values for which local Los Angeles signals may be accessed.

Implementation of this fourth detection method is similar to that described above with respect to the other unauthorized signal usage detection methods, with minor adjustments as will be apparent to those skilled in the art.

Detection Method 5: Authorization Indicia

In a fifth detection method of the embodiment, detection of unauthorized signal usage is premised on one or more indicia that may be sent to one or more receivers 16 to indicate that receivers 16 are allowed to access or use one or more specific channels, programs, or applications. Such indicia can be created and managed in a separate subsystem from conditional access system 20, such as an iTV subsystem. A subsystem implementing this method may act as a secondary conditional access system to network 10.

For example, in the iTV environment, the fifth detection method may, for a high-value service such as a premium movie channel, create and transmit one or more iTV applications to receivers 16 in network 10 to store a data element on one or more receivers 16. Within the application transmitted, different values for a data element can be set based on whether a receiver 16 is authorized or not to receive the premium channel, or the simple existence or definition of a given data element on a receiver 16 can be used to indicate that the receiver 16 is authorized to receive the service or signal. An application to create and/or set the value of the indicia on can be applicable to a range of receivers 16, and can set the variable on each receiver 16 within the range of authorized receivers 16, so as to indicate whether or not a particular receiver 16 is authorized to receive the service or services through the signal.

The same mechanisms described earlier for controlling access to logs and other data on a receiver 16 may be applied to the storage and retrieval of such data elements for this fifth detection method. Once one or more such data elements have been created and set on a receiver 16, a separate process can then test for the existence of one or more such data elements or for values of such data elements against available usage records 100 to determine if the presence or value of one or more data elements is consistent with the values of one or more usage records 100. For example, a process may create a specific variable, bit string, file or other data element only on receivers 16 in a list of one or more authorized receivers 16. If so, then the same process or another subsequently running process can check available usage records for indication that a specific channel was viewed, and, if so, can then check if an appropriate data element is present and has a specific value to indicate that access to that signal for the specific channel has been authorized.

Implementation of this fifth detection method of the embodiment is similar to that described above with respect to the other detection methods, with minor adjustments as will be apparent to those skilled in the art.

Detection Method 6: Usage of Pay-Per-Usage signal Without Purchase Record

Figure 6:
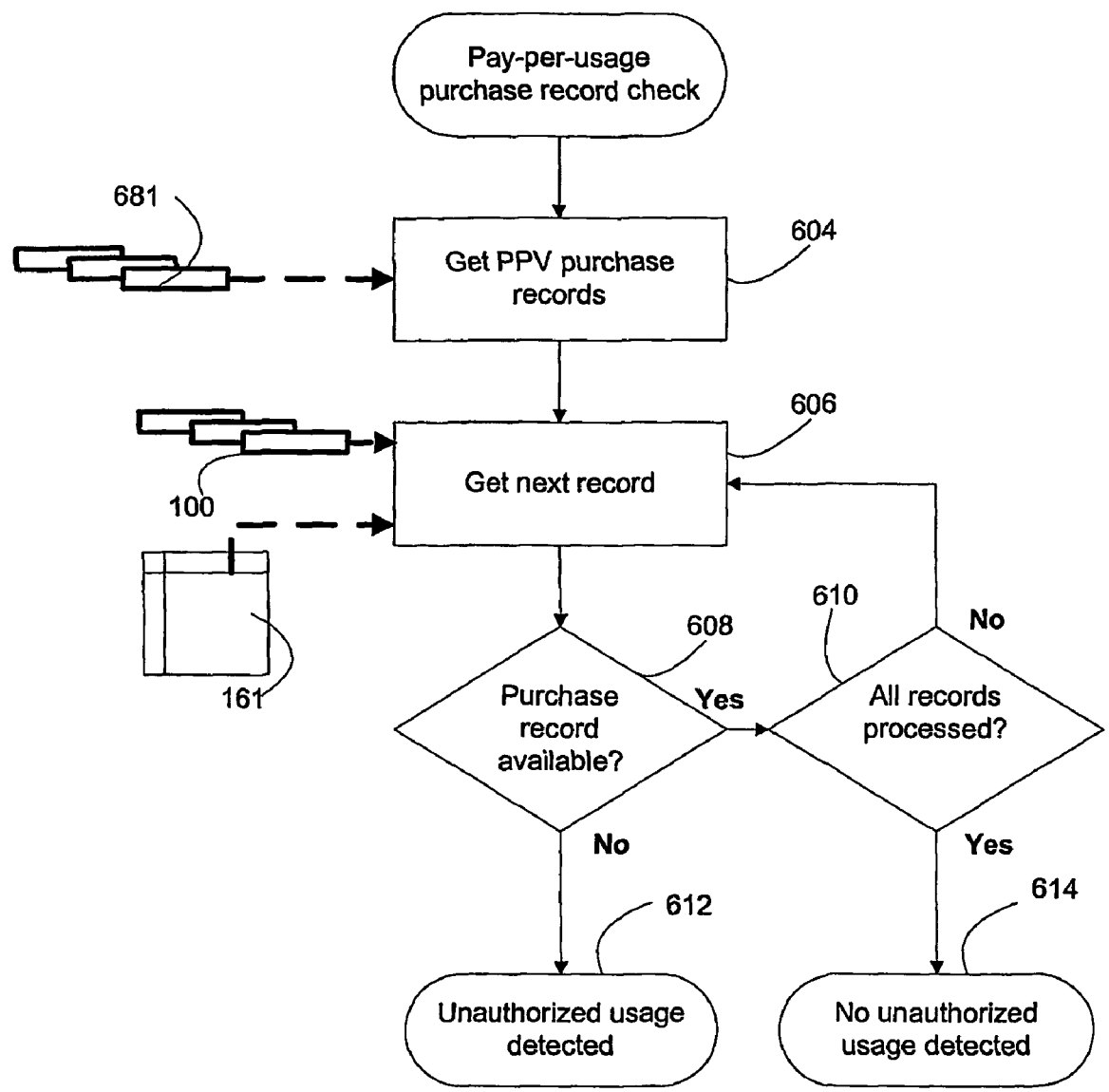
FIG. 6 is flow diagram for detecting purchase records for pay-per-usage signal usage in the network of FIG. 1.

Referring to FIG. 6, a flow-chart diagram is shown of analysis of signal usage records 100 to verifies if a pay-per-usage signal has been properly purchased is used as indicia of unauthorized signal representative of a sixth detection method of the embodiment. Pay-per-usage signals may include pay-per-view movies, events or other programs.

Typically a user of a receiver 16 associated with television programs may purchase pay-per-view signal through usage of receiver functions of a receiver 16, which purchase typically results in the creation of an event purchase record within the receiver 16. The pay per view purchase may also be reported from the receiver 16 to a server in network 10 such as conditional access system 20, a subscriber management system 25, other system or combinations thereof by way one or more of the communication networks available to the receiver 16, such as communication network 15. The user of the receiver 16 may have functions available on the receiver 16 that allow the user to review which pay-per-view signals or other content was purchased using the pay-per-view or other credit-based functions.

In a receiver 16 where security has been compromised, a user may be able to access or view pay-per-view content and signals without first going through the payment process of pay-per-view. Therefore, in cases where security has been compromised, there may not exist a purchase record at a receiver 16 where one would be expected when a viewer is accessing pay-per-view content through the receiver 16. In a compromised system, the pay-per-view signal usage is initiated without going through the purchase process, and therefore no purchase record is created on receiver 16.

For instance, the method is shown in one embodiment in FIG. 6. At step 604, pay-per-view (PPV) purchase records 681 are retrieved, which may be available from a receiver 16 or a network component of network 10, such as CA 20. PPV records 681 may be directly accessible through memory, file or other storage access; through a function call, network protocol or other form of request of communication with a subsystem such as RCAS 26 on the receiver 16 that may have the information, or through access to another component in network 10. Thereafter, at step 606 a usage record 100 representing the current state of receiver 16, or set of usage record logs 161 is retrieved. Then at step 608, the usage record 100 or record log 161 is analyzed as described above for indicia of PPV signals usage without a purchase record. If so, then the method proceeds to step 612 to conclude that unauthorized signal usage occurred at the receiver 16. In this respect, if at least one usage record 100 does not have a corresponding PPV purchase record 681, then unauthorized signal usage may be deemed to have occurred. If there was no indicia of a lack of consistent PPV signals purchase record 681 at step 608, then step 610 is taken to determine if there are other records 100 which are desired to be processed. If not, then the method proceeds to step 614 to declare that no unauthorized signal usage is detected. If so, then the method returns to step 606 to get the next record 100 or log 161 for processing at step 608.

The comparison of PPV purchase records 681 and the current usage records of step 608 may potentially require more than just a channel number, as multiple pay-per-view events may be scheduled on the same channel, and certain events on pay-per-view channel may not be pay-per-view events, as described above. The comparison may in such cases be made against an event identifier code or against the time and date of the event It will be appreciated that other data items and methods for matching usage records to purchase records may be used in other embodiments.

In another embodiment, a process such as, for example, an iTV process, can be provided specifically for a given pay-per-view event. In another embodiment, step 604 can be omitted and the comparison of step 608 will look for a specific data value in the purchase log.

The comparison of purchase records 681 to signal usage records 100 in the purchase record for a signal used at step 608 may also compare the purchase records 681 to multiple available usage records 100. The number of records 100 used for comparison may be limited by using criteria such as a maximum number of records 100, the records 100 from a given period of time, the records from a set of channels, or other criteria. Such limitations may be based on usage parameters. Such parameters may be made available by including the optional step 210 of the second detection method described with reference to FIG. 4 to acquire the appropriate parameters, and implementing the test 606 in a manner that uses the parameters. Such limitations and methods for setting the limitations may be applicable to the other methods for determining unauthorized usage described herein.

Implementation of this sixth detection method of the embodiment is similar to that described above with respect to the other detection methods, with adjustments as will be apparent to those skilled in the art.

Detection Method 7: Trap Channel

Figure 7:
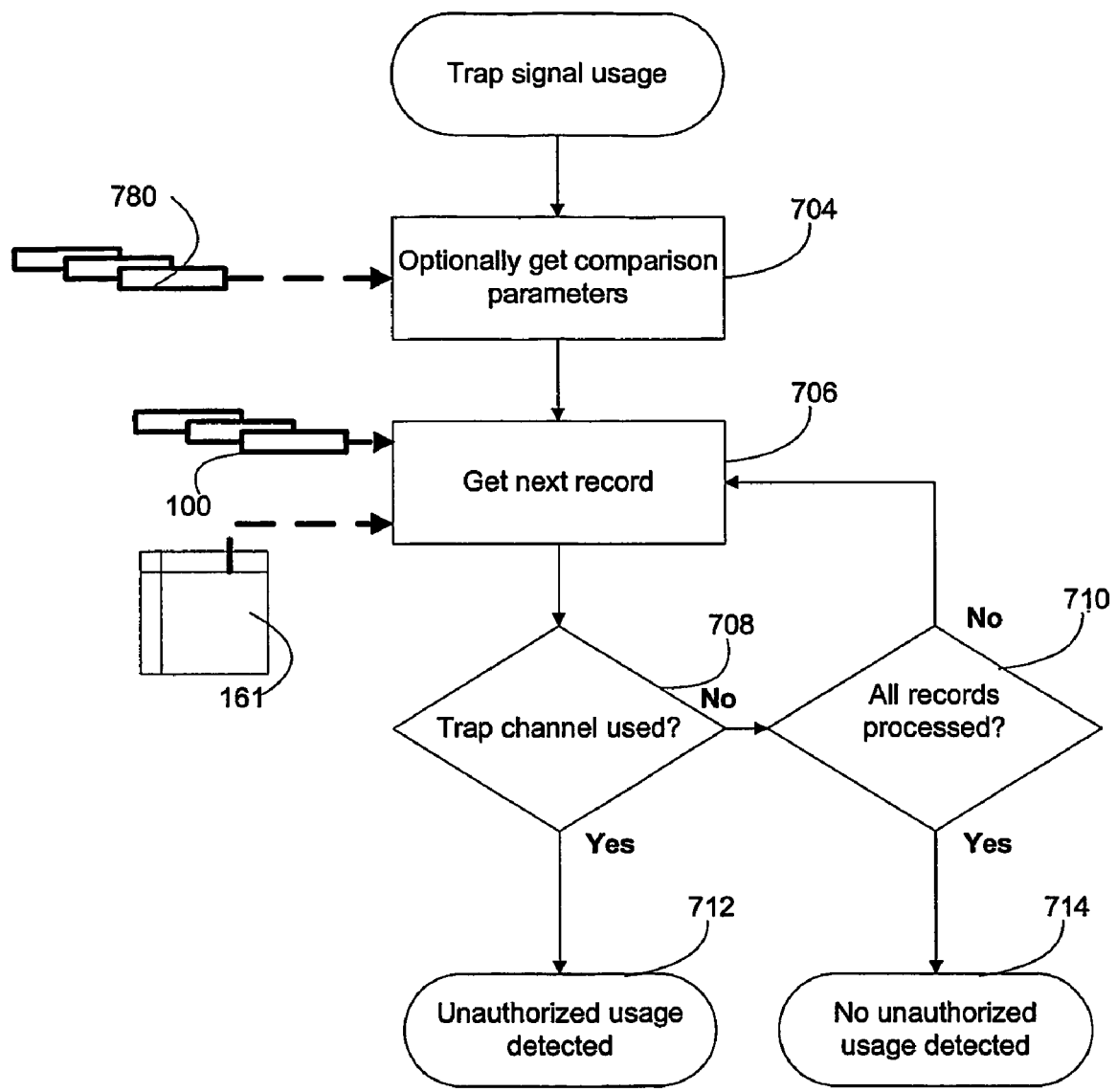
FIG. 7 is a flow diagram for detecting usage of a trap channel in the network of FIG. 1.

Referring to FIG. 7, a flow-chart diagram of a seventh detection method of the embodiment is shown, whereby indicia relating to usage of a channel that is not normally authorized for subscribers in network 10 is used to detect unauthorized signal usage.

An operator of network 10 may provide signals to the network that are not normally authorized for use by any customer receivers 16. Such signals may include test signals, signals for internal operations, signals specifically transmitted to help in the detection of unauthorized usage, and other signals not normally authorized for any customer access or use. These various forms of signals are referred to as trap channels. Any usage of these trap channel by a receiver 16 can be considered an indication of unauthorized usage at the receiver 16.

Referring to FIG. 7, parameters 780 relating to indicia of unauthorized signal usage relating to trap channel use is retrieved at step 704. Thereafter, at step 706 a usage record 100 representing the current state of receiver 16, or a set of usage record logs 161 is retrieved. Then at step 708, the usage record 100 or record log 161 is analyzed for indicia of trap channel use. This may be done by comparing usage record 100 or record log 161 against a list of one or more trap channels identified by parameters 780. If evidence of trap channel use is found, then the method proceeds to step 712 to conclude that unauthorized signal usage occurred at the receiver 16. If there was no indicia of trap channel use at step 708, then step 710 is taken to determine if there are other records 100 which are to be processed. If not, then the method proceeds to step 714 to declare that no unauthorized signal usage is detected. However, if additional records 100 or logs 161 are to be processed, then the method returns to step 606 to get the next record 100 or log 161 for processing.

Figure 8:
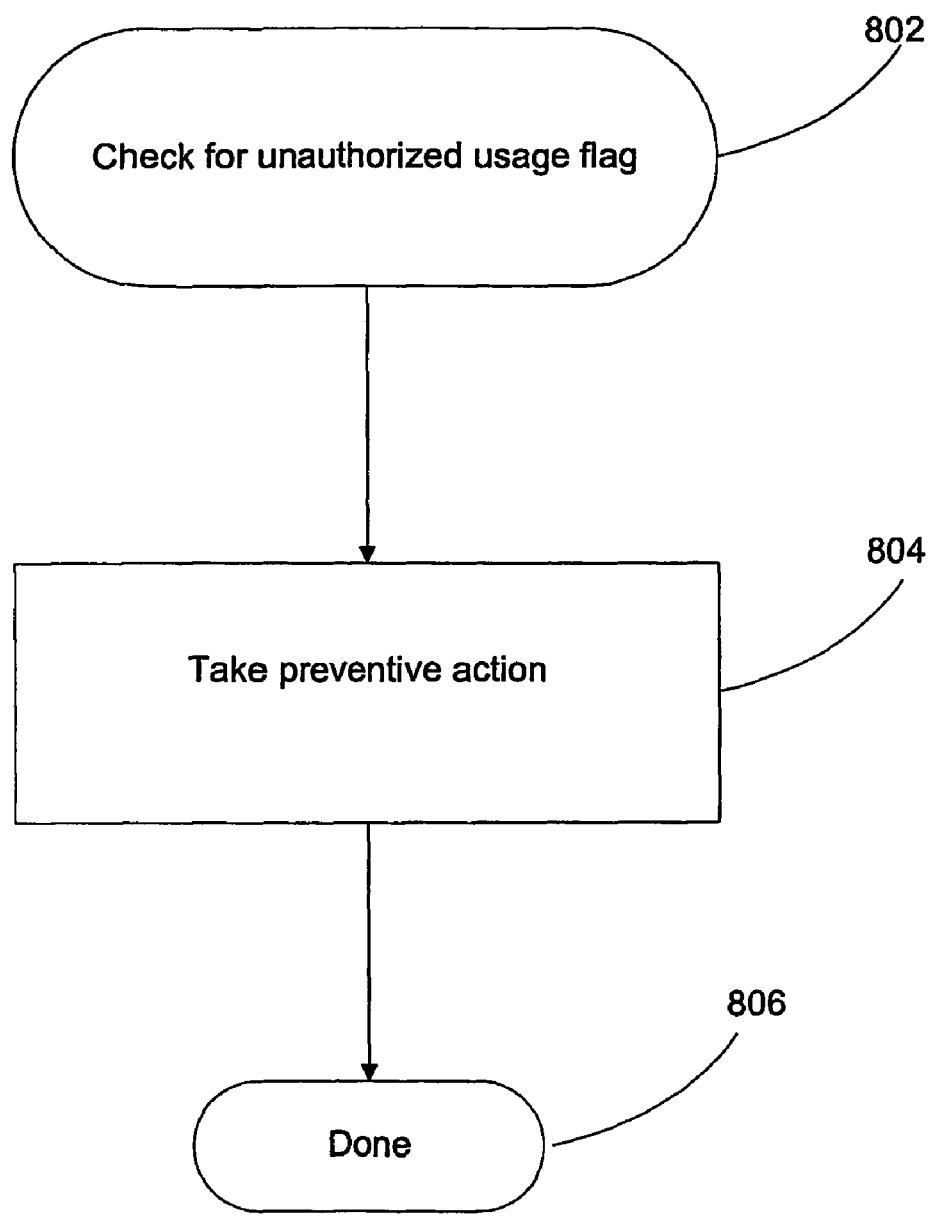
FIG. 8 is a flow diagram for taking preventive action based on unauthorized usage in the network of FIG. 1.

Referring to FIG. 8, another embodiment is shown for a detection and prevention scheme for unauthorized signal usage based on trap channel information. At step 802, there is a check for any record of a use of a trap channel, such as via an examination of a usage record 100 or record log 161. In this embodiment any indicia of such use is deemed sufficient to make a determination of unauthorized signal usage at the receiver 16 associated with the usage record 100 or record log 161. Thereafter, preventive action is taken at step 804, as explained below and then the entire detection and prevention scheme terminates at step 806.

In another embodiment, a trap channel can be created using audio, video or other signals that may be associated with other channels. The trap channel is created with these signals but with separate control information so that the trap service is not available to normally authorized subscribers, even though the same audio and video signals may be part of other services that may be part of normal subscriber authorizations. For example, referring to FIG. 9, Channel 3 is a channel that may be authorized using normal subscription commands. In this example, the same video and audio components are also used by Channel 4. However, Channel 4 has a separate CA stream CA4, and an iTV component iTV2 associated with it. iTV2 contains the software and data necessary to perform a trap function. Channel 4 is never authorized within a normal subscription. Therefore, for this example only users of compromised receivers 16 would be capable of accessing Channel 4. The conditional access system 20 may provide the control information and data required to generate stream CA4. The multiplexer 13 may provide the encryption and a portion or all of the SI generation facilities, which define the channels and their associated streams.

In another embodiment, a trap channel is authorized for all viewers on all receivers 16 in network 10, but access is controlled through a blackout zone or other control mechanism in a manner that prevents viewing of the channel for all normally authorized viewers. In this way, unauthorized signal usage may still be identified by any record of usage of the trap channel.

Implementation of this seventh detection method is similar to that described above with respect to the other unauthorized signal usage detection method, with adjustments as will be apparent to those skilled in the art.

Detection Method 8: Full System Channel or Program Blackout

The eighth detection method of the embodiment described above requires that a specific channel be added to network 10 as a trap channel. An alternate way of creating a trap channel without using additional bandwidth is to use an existing channel during a period when the channel is not being used as the trap channel, such as a local television channel going off-air overnight.

During the unused period, a program can be created with a blackout definition that would prevent a set of some or all normally authorized receivers 16 from using the signal associated with the trap channel. Any receiver 16 within this set, however, that has a usage record 100 evidencing use of this channel can then be determined to have engaged in unauthorized signal usage. Implementation of this eighth detection method is similar to that described above with respect to the other detection methods, with adjustments as will be apparent to those skilled in the art.

Detection Method 9: Combinations of Tests and Methods

Figure 10:
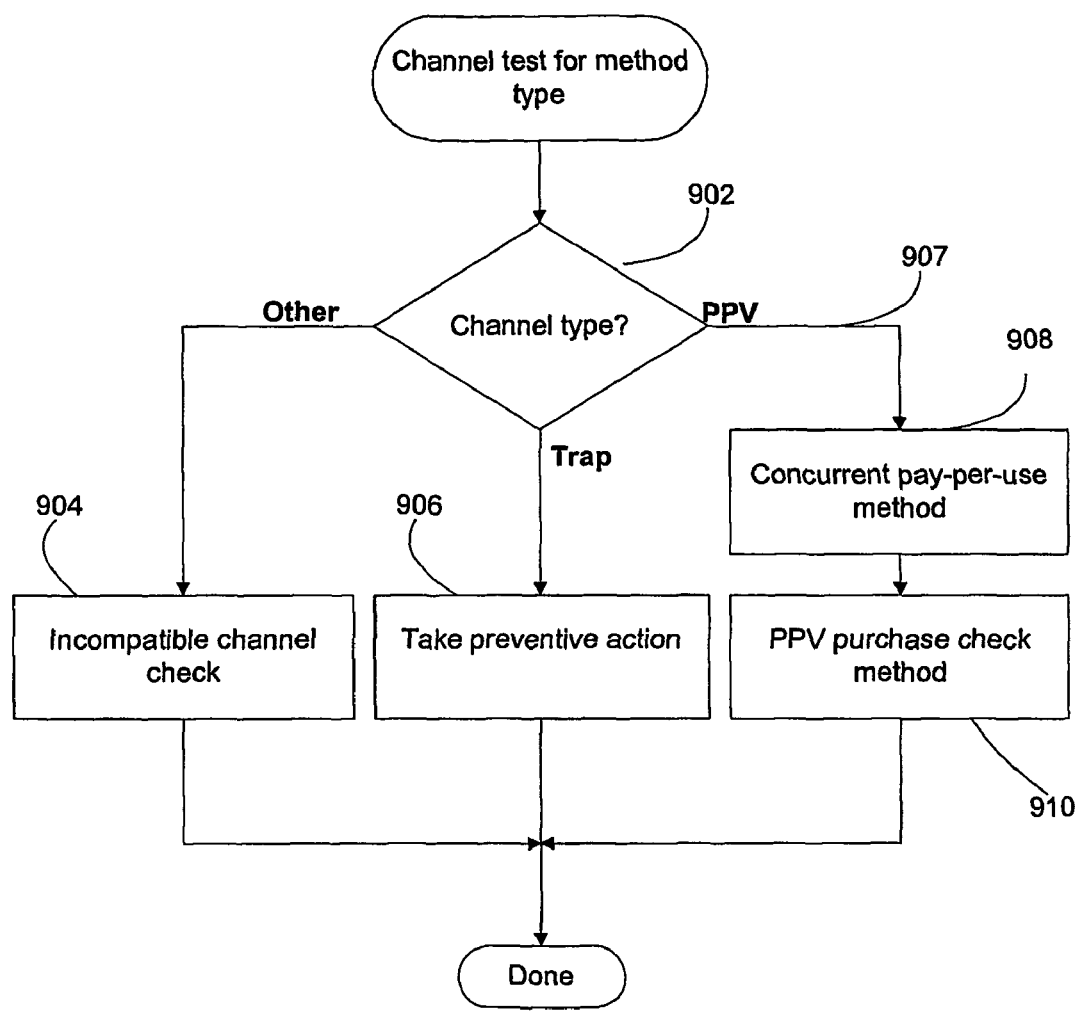
FIG. 10 is a flow diagram of the use of combinations of unauthorized usage detection methods in the network of FIG. 1.

In a ninth detection method of the embodiment, the previously described detection methods are used in combination to evaluate indicia of unauthorized signal usage as part of step 308 described above with reference to FIG. 3. Referring to FIG. 10, an exemplary ninth detection method is shown in which the detection methods previously described are combined within a single method which first determines at step 902 the channel type associated with the set of usage records 100 being evaluated. Tests for additional channel types may be included in other embodiments. In the embodiment as shown in FIG. 10, if at step 902 the channel type is determined to be a trap channel, then applying the seventh or eighth methods it may be determined immediately that there was unauthorized signal and so that preventive action, as described below, is taken immediately at step 906. From step 902, if a pay-per-view channel types is detected then path 907 is taken to step 908 for evaluation of indicia of unauthorized signal usage by the above described concurrent pay-per-use method, and then at step 910 by the above described Pay-Per-View purchase check method. If at step 902 neither a trap nor PPV channel is detected, then step 904 is taken to perform a check for incompatible channels as per the method of detection method 1 described earlier. For the example shown in FIG. 10, it can be seen that one or more test methods can be applied for a given channel type, such as the two tests for a PPV signal in steps 908 and 910, and that for other channels, such as a trap channel, no test method are necessarily utilized (as shown in step 906). It will be appreciated that in other embodiments, other combinations of tests and methods may be used.

The processes may be configurable through the use of parameters as described above to determine the timing, channels, content, signal or other constraints on when the steps of one or more detection methods of unauthorized signal usage as described herein may be executed.

Combinations of methods under this ninth detection method may include but are not limited to:

Requirement that a minimum number of separate methods show that unauthorized usage has occurred;

Requirement that one or more specific methods show that unauthorized usage has occurred;

Requirement that a minimum number of instances of each of one or more detection methods show that unauthorized usage has occurred;

Requirement that a minimum number or combination of determinations of unauthorized usage have taken place within defined time period.

Optional Preventive Action Processing

Referring back to FIG. 3 now, after step 308 is completed, if no unauthorized signal usage was detected by way of one of the above described detection methods in step 308, then path 309 is taken to step 312 to complete the process of detecting unauthorized signal usage. However, if at step 308 unauthorized signal usage was detected, then step 310 is taken, where optionally a preventive action process may be initiated.

The preventive action at step 310 may be implemented as one or more processes or steps. For example, upon detection of unauthorized usage, an instance of a preventive action process 300a may simply set a flag to indicate that unauthorized usage has occurred at the receiver 16 in question. Another instance of a preventive action process 300b can be execute at a later time, in which the process checks for the flag indicating unauthorized viewing has occurred, and then takes further steps to prevent or otherwise disrupt usage of the receiver 16 in question.

An instance of preventive action process 310 may include, but is not limited to, any or all of the following actions:

Displaying a message, graphic or other content in a manner that blocks the usage of the underlying content from being viewed or used at receiver 16. As an example, when implemented on a television receiver, a message box could be displayed that covers the entire screen;

Distorting or otherwise hindering the presentation of the content at receiver 16;

Logging a record of the unauthorized signal usage event;

Switching the receiver 16 to another signal, such as a different channel for television receivers;

Disabling one or more capabilities of the receiver 16, or disabling the entire receiver 16;

Displaying a message to the receiver 16 for viewing by a user thereon;

Reporting the unauthorized signal usage event to another network component or system using any network connections or communications protocols that may be available in network 10;

Reporting the unauthorized signal usage event to conditional access system 20 or a component thereof, such as receiver 16;

Testing to verify that two or more instances of unauthorized signal usage have occurred before one or more actions are taken. Such a test may also require that the multiple usage records 100 indicate that the events took place within a given time period; and Where preventive action process 310 takes place outside of a receiver 16, sending flags, processes, instructions or other data to the receiver 16 to prevent usage of any or all signals on the receiver 16.

It will be appreciated that other preventive measures may be used in other embodiments, on the basis of different types of receivers 16 and networks 10.

Instances of the preventive action process 310 and the actions taken therein may vary from method to method of taking preventive action, between channels and services, at different times of day, or based on other parameters accessible to the process. In one embodiment, separate preventive action processes for separate methods may set separate flags to indicate that unauthorized signal usage has occurred. A given flag may be based on one or more methods, instances, channels or other characteristics.

These flags may be used set on a global basis for the receiver 16 in question, to indicate one or more forms or instances of unauthorized signal usage; on a per service basis, to indicate unauthorized use of a single service; or on a class of service basis, to indicate unauthorized use of a group of services such as, for example, pay-per-view services. A given flag may be a binary indicator of whether the flag has been set, or may contain one or more fields such as a count of the number of times the flag was set to indicate the number of instances of unauthorized usage detection of the type applicable to the given flag, date and time information, and other data.

In other embodiments there may be multiple implementations or versions of the preventive action processes 310. These different versions of the process 310 may perform different actions, and may be dependent on prior execution of one or more specific instances and versions of preventive action processes 310. For example, one preventive action process to disable a receiver 16 may require that flags be set to show more than one type or instance of unauthorized usage has been detected, such as viewing a combination of channels that is not authorized as described as the first detection method describe above, and channel surfing through multiple PPV channels as describe as the third detection method described above. Such a preventive action process 310 will therefore not disable the receiver 16 until other preventive action processes 310 have been invoked to set appropriate flags that indicate the two types of unauthorized signal usage have occurred, in accordance with, for example, the ninth detection method. Different preventive actions may therefore be optionally invoked based on different combinations, types and frequencies of unauthorized signal usage.

The types of structures that can be used to represent flags are the same as those that can be used to represent usage records 100 and log entries, as described above. When a flag is first used, a process may check for the existence of the flag, and if it is not available, create the appropriate structures as required, in one or more manners as known in the art. These flags may then be examined by receiver 16 or a CA 20 of network 10. Upon detecting that a "disable" flag is set at receiver 16, the receiver 16 may disable itself by not allowing one or more signal to be further used at the receiver 16, or the CA 20 may no longer permit one or more signals to be used by the receiver 16. Examples of preventing access can include changing to another channel, displaying a message, shutting off the receiver and others, as described above The same mechanisms described in greater detail below for controlling access to logs and other data on the receiver 16 may be applied to the creation, storage and retrieval of data elements of these flags.

Acquisition of Usage Records

Additional details regarding the acquisition of usage records 100 will now be provided. Usage records 100 may be provided and stored as data sets, such as software modules or databases stored at one or more components of network 10 as known in the art. While it will be appreciated that other methods of acquisition of usage records 100 may be used, as examples only and not as limitation, methods of acquiring usage records 100 include:

Passing of the current receiver state of a receiver 16 as one or more parameters to the process of acquisition of usage records 304 as part of the process initiation of receiver 16. This method may be of use when as part of a software subsystem such as an EPG which already has the required information;

A function call to the operating system or another subsystem within a receiver 16 which can provide access to the requested records. An EPG subsystem, an iTV environment, a viewing measurement subsystem or an advertising management system would typically have the information and may provide the functions required. Other subsystems may also be capable of providing the functions or data required in other embodiments;

A memory access to a specific memory or other storage location where the required information is stored, which may be in receiver 16 or in another location in network 10;

Where a server external to receiver 16 receives a channel change request, such as would be the case in a switched environment such as a DSL or Internet-based digital television or other signal delivery system, a process on the server can capture the channel change request or the resulting channel change, or pass the channel change information to another process on the same or another server;

Periodic polling of receiver 16 or a server component in network 10. A process can execute on a server which requests one or more records from the receiver 16, or from a server process that has acquired one or more records from the receiver 16;

Requesting or accessing of the usage records 100 from another system or subsystem within receiver 16 or external to the receiver 16 that is used to maintain usage records 100, such as a diagnostic subsystem, an audience measurement system, advertising management system, electronic program guide software or other system. Such system may accumulate records within receiver 16, and may also gather records from the receiver 16 for storage on one or more server systems in network 10;

Data from a subscriber management or conditional access system, such as SMS 25 or CA 20, that holds limited viewing records reported by a receiver 16. For example, subscriber management system 25 will collect pay-per-view purchase records from a receiver 16, either directly or indirectly through CA 20;

Using data from state information, memory locations, registers or access to functions or features of the receiver operating software or any subsystem that can provide the current state for features of receiver 16. Such state information may include information on content the viewer on the receiver 16 is currently or has recently used. State information may depend on the features available on the receiver 16 and the related data these features may require. Examples of these features include the "previous channel" feature, which, in a television receiver, holds information on the channel that was viewed prior to the current channel being viewed; the picture-in-picture feature, which will have data on two viewed channels; the "previous channel" feature that may be associated with a picture-in-picture feature, and may therefore have data on four separate channels, including the current main picture channel, the previous main picture channel, the current picture in picture channel, and the previous picture in picture channel; the recording function on a PVR-equipped receiver, which may be recording from a channel while a viewer is watching another channel. The data from this feature provides access to another usage record 100, and may be available through one or more methods described above.

It will be appreciated that other methods of acquiring signal usage records 100 may be used in other embodiments.

Figure 11C:
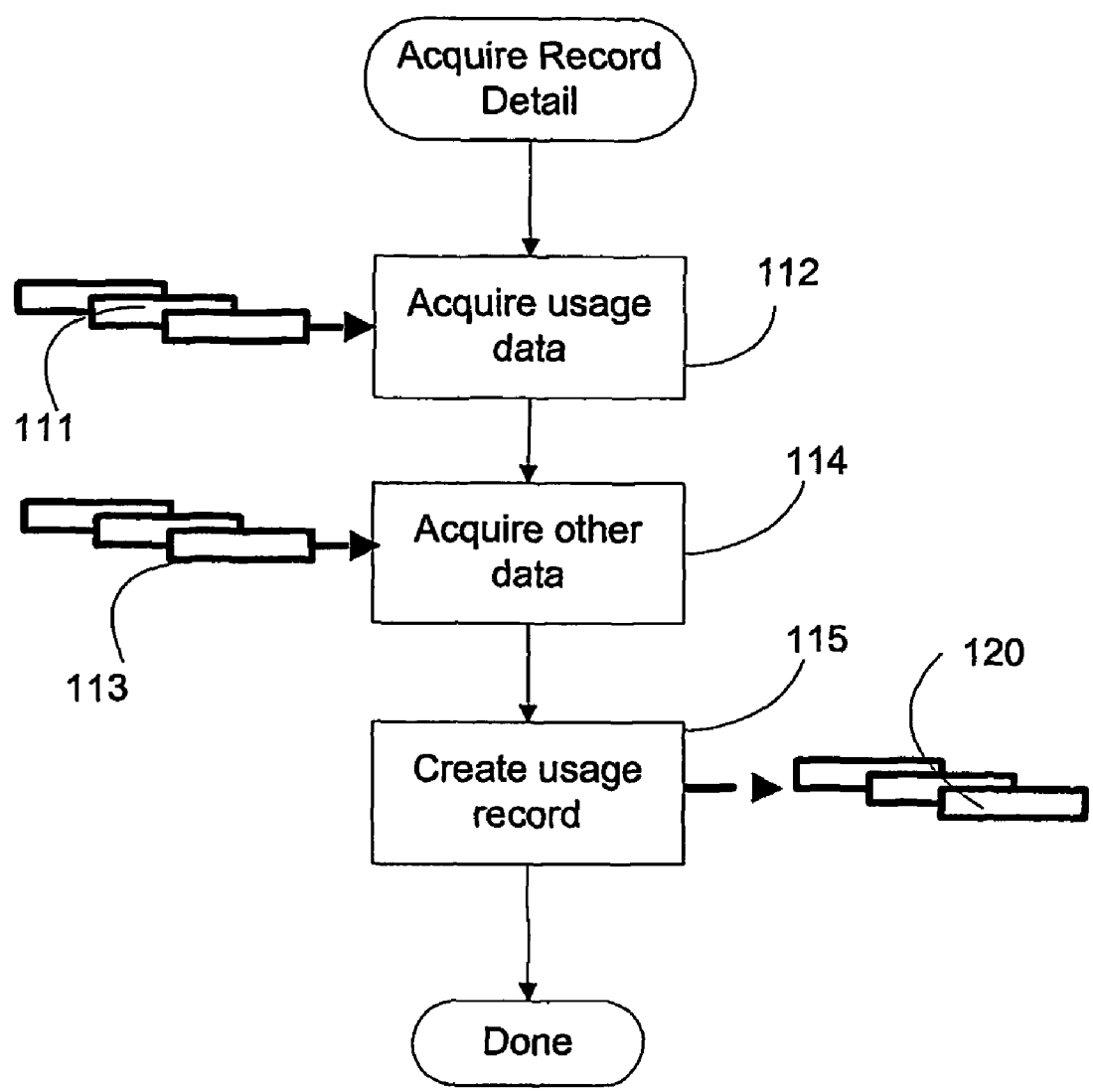
FIG. 11C is a flow diagram of usage record acquisition from multiple sources in the network of FIG. 1.

Referring now to FIGS. 11A, 11B and 11C, there are flow charts showing the steps of acquiring one or more usage records 100 in an embodiment. In FIG. 11A, the usage data 111 represents the source of the data. This data may be from one or more of the methods and sources described above, obtained using one or more functions as appropriate for the source of the records. At step 110 the data from the required source is obtained and then placed into records 120 for further use by the other steps of the method. Records 120 may be in the form of variables in memory within the process, in shared storage, in parameters to a function call for the next step of the method, in a record for transmission to another process or system, or other form of storage that would allow access to another process or transmission to another system or process. In other embodiments, the records 120 may simply consist of the same data and storage location as the data 111, providing that data 111 is accessible to subsequent steps of the method as required. The storage of one or more records 120 may involve transmission of the one or more records to another process or system that will directly or indirectly store the record 120 or portion thereof.

Referring to FIG. 11B, an optional logging process 140 is used to enter records 120 into a log 161. Details regarding this optional logging provided with reference to FIGS. 12A to 12D, described further below.

Referring to FIG. 11C, additional details of the acquire records step 110 of FIG. 11A is provided. In step 112, the usage data 111 is accessed using one of the mechanisms described above. In optional step 114, additional data may be accessed as required to create the usage record 100. For example, the viewing data 111 may consist of data from a memory location, register, parameter passed to the process, result from a function call or other method that provides the current channel number. Additional viewing data such as the program type may also be acquired in step 112 from sources such as an electronic program guide. In step 114, other data such as the time of day may be acquired from a memory location, result returned from a function call on memory location, parameter passed to the process or from another method is collected. In step 115, one or more signal usage records 100 are created using the data acquired in steps 112 and 114. The process of creating usage records 100 may require their creation or availability on another component or components in network 10, in which case usage records 100 would consist of one or more data structures for transmission to another software component on another component or components in network 10.

While some embodiments may utilize multiple viewing records, the method does not require that all usage records 100 be obtained or retained. For instance, a periodic polling of the receiver state of receiver 16 may not have the records for all the content viewed, but one or more iterations of the process can nevertheless generate sufficient data to make a determination of unauthorized signal usage in accordance with the methods and schemes described above.

The acquisition of usage records 100 may optionally including storing one or more of the usage records 100 in one or more logs 161. One or more elements of a usage record 100 may be stored. The records 100 to be stored, the log 61 in which they are stored, and the elements of the record 100 to be stored may be selected based on the channel or content type, time of day, volume of records, availability of storage space and other factors determined to be appropriate for the unauthorized signal usage detection and prevention scheme being implemented.

Referring to FIGS. 12A-12D, examples of the steps of logging process 140 of FIG. 11B that may be used in the creation of a log 161, the entry of records into the log 161, and the management of the log 161 is provided.

Figure 12A:
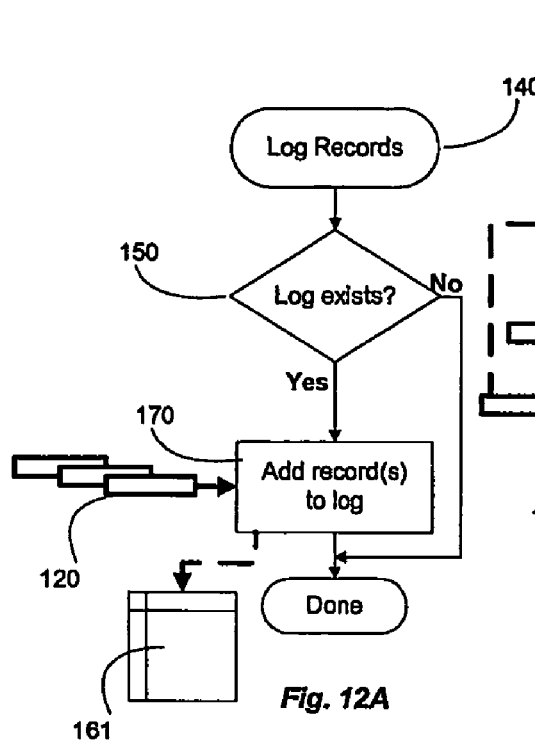
FIG. 12A is a flow diagram of adding usage records to an existing log in the network of FIG. 1.
Figure 12B:
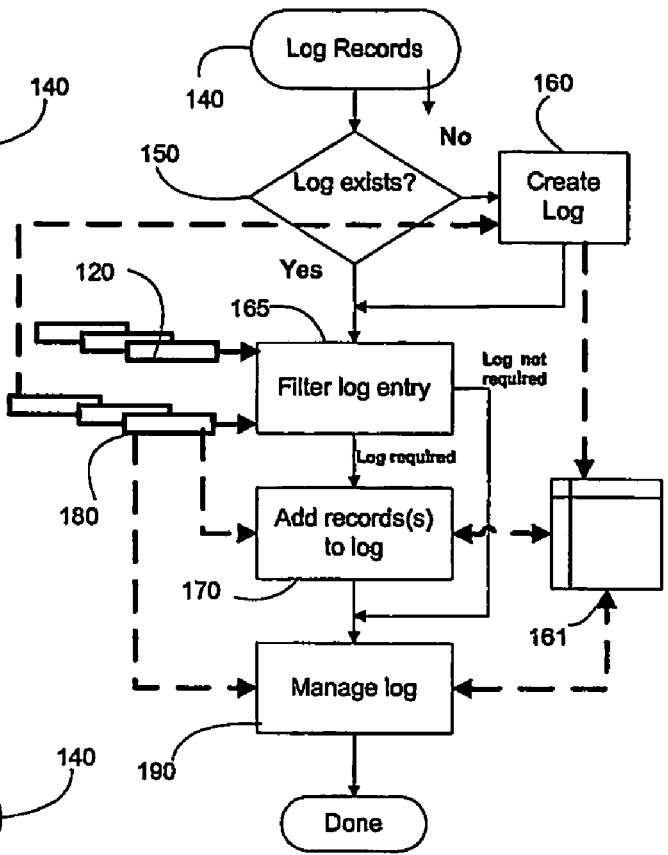
FIG. 12B is a flow diagram of creating a log and adding, filtering and managing entries to the log in the network of FIG. 1.

FIG. 12A shows the basic steps for entering a usage record 100 into a record log 161. In step 150, a test for the existence of the log 161 and a related log creation step 160 as shown in FIG. 12B are optionally provided within a logging process 140, as a log 161 may be defined, initialized and generated. For example, log 161 can take the form of an array that is defined and initialized as a set of one or more memory storage variables or records within the application program that implements the logging process 140.

However, if the optional steps 150 and 160 are taken, then where it is determined at step 150 that a log 161 does not exist, the create log 160 step may allocate the storage space required and may initialize the space as required to allow storage, retrieval and management of the records 100 in log 161.

The log 161 may be represented as a set of records stored in memory, on disk, or in any other form of storage accessible by the various components of network 10 associated with the conditional access system 20, such as CA 20 itself and RCAS 26 of receiver 16. The log 161 may take the form of one or more records, which may consist of a sequential list of data, a set of records, a file or other storage format The physical storage for records 100, log 161, and other data structure described above may be in any form of storage such as memory, registers, or disk or other forms of storage, and may be located on or accessible to any of the systems or subsystems described above within network 10. Even volatile forms of memory may be in some embodiment, since long-term storage of records and data structure is not necessarily required, as the various embodiments described above does not necessarily require a complete or extensive set of usage records 100 to detect unauthorized signal usage and to take optional preventive action. The log 161 may be in a form that provides a measure of self management, such as a circular log, where any new entry overwrites the least recently used entry. The log may also be in a form that requires management, in which case filtering and log management processes may be required, as described below.

In an embodiment, log 161 can reduce the amount of storage from what might typically be used by keeping a single bit for each channel that is of interest for unauthorized signal usage detection purposes. For example, a bit value of zero would indicate that the channel had not been used, and the bit for a given channel would be set to one when a usage record indicates that the channel has been used.

The step 170 of adding one or more records to the log 161 takes one or more viewing records 120 and enters them into the log 161. The method of updating will depend on the format of the log 161 selected. If the log 161 takes the form of a record of whether or not a given channel is viewed, then the entry to the log would simply update the existing record for the particular channel. If the log 161 is intended to gather both channel information and the time of viewing, then a new record may be appended to the log. The acquisition of usage records process step 304 referred to in FIG. 3 may also transmit log records to a separate network component for storage and further processing.

FIG. 12B is a flow diagram of logging process 140 with the optional steps of filtering a log entry at step 165 and managing the log step 190. The optional filter log entry step 165 may be used to reduce the number of entries in the log 161 based on conditions stored within the process, or using parameters available to the process. For example, logging may only be required for specific channels, and therefore some entries may be deleted and not logged. The list of channels to be logged may be stored as data within the process, or may be provided as data in a parameter list 180 that is accessible to process 140.

Record filtering at step 165 may include elimination of consecutive records for the same service or content (for example, in a periodic polling scenario, consecutive records for the same channel may be deleted since there is in effect no state change from the first record); limiting the storage of records to signals of interest to the operator from a theft of signal perspective; limiting the records to a single record per channel or instance of content, and other mechanisms. Where a single record 100 is kept per channel or instance of content, an existing record may be updated with the current record 100. For example, if only a single record 100 per channel is kept and the record 100 includes the time the usage occurred, the time of usage could be updated with the time from subsequent viewing records for the same channel. It will be appreciated that a variety of compression methods may be used in different embodiments.

The optional manage log 190 step is used to further manage the content, size, location or other features of the log 161.

A logging process 140 may use encryption, checksums, digital signatures and other techniques to protect the content of the log 161 from being accessed or tampered by other processes or hackers attempting to circumvent unauthorized signal usage detection and prevention. Furthermore, information which may be unique and may be available from a subsystem within a receiver 16, or other source accessible to the logging or other processes, may be used to make the storage identifier, location, encryption key or other characteristic of the log 161 unique to one or more receivers 16, or to change the location or other characteristics of the log 161 on a periodic basis, thus increasing the difficulty for a person or persons attempting to determine the means of operation of the unauthorized signal usage detection methods of the embodiment. A logging process 140 may modify, move, delete or replace the existing log structures. In this manner, means that may be used by hackers to detect, disrupt, or destroy the log structures can be circumvented. In such cases, the create log step 160, add log record(s) step 170 and manage log step 190 may require access to parameters 180 or other data to coordinate the placement, method of entry, access and management of the log entries.

Figure 12C:
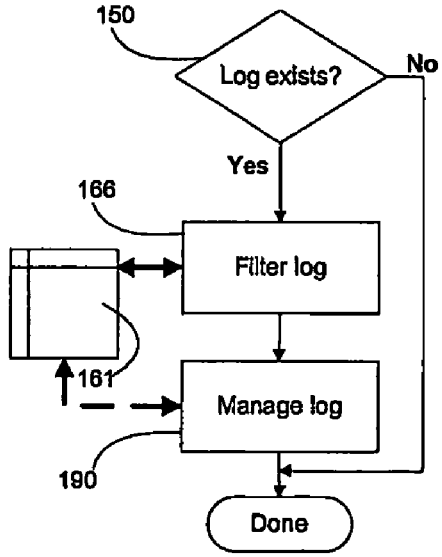
FIG. 12C is a flow diagram of filtering and managing records in an existing log in the network of FIG. 1.
Figure 12D:
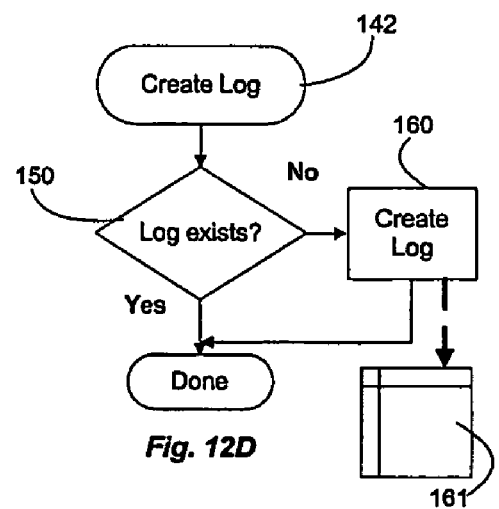
FIG. 12D is a flow diagram of creating a usage log in the network of FIG. 1.

In other embodiments, the logging, log creation and log management functions may be within the same process or occur as separate processes. The logging and log management functions would only execute if the log 161 had already been created by an instance of the log creation process 160. FIG. 12C shows a flow-chart for a separate process 141 that is used for log filtering and management The filter log step 166, in this case, may filter log 161 based on the current content of the log 161 and not on the record 100 currently being written. The process of FIG. 12C may be dependent on the prior execution of a process 140 or 141 that created the log 161. In FIG. 12D, a separate process that creates a log 161 is shown.

It will be appreciated that other methods of acquiring and managing records 100 and logs 161 will be known to those skilled in the art.

Optional Execution of Steps Not in Immediate Succession

Referring to FIG. 3, a scheme for unauthorized signal usage and prevention is shown in which the acquisition of usage records 100 at step 304, evaluating usage records 100 at step 305, detecting unauthorized usage at step 308, and optionally initiating preventive action 310 appear as executing in direct, immediate succession.

However, the steps referred to in FIG. 3 are not required to operate in immediate succession, and may operate at different times. To minimize use of system resources, one or more processes implementing each of, combinations of or parts of the acquisition of records 304, the analysis of records 305, the optional steps of preventive action 310, and the creation, making of entries to and managing one or more usage logs 161 may occur in immediate succession as shown in FIG. 3, or may be performed or executed independently at different times. However, to successfully execute, a particular step of FIG. 3 may require that one or more of the preceding steps have executed at least once, and the results of that step be stored in network 10 so that the next step shown in FIG. 3 may operate. For example, for step 305 of evaluating to occur, step 304 of acquiring the usage record 100 must have first occurred at least once, so that at step 305 there are usage records 100 to evaluate.

This ability to execute steps shown on FIG. 3 independently of the other steps shown thereon at different times provide embodiments utilizing the feature with several advantages. Performance, space for executable code and data, availability of bandwidth for transmission and other factors may affect the ability of an operation of network 10 to distribute applications and data to receivers 16. As such, with network servers, other network components, or combinations thereof having the ability to send programs or processes across network 10 implementing only specific steps described in FIG. 3 at any given time provides the operator of network 10 with greater flexibility to implement an unauthorized signal detection and prevention method as described above. In some cases, an implementation that may otherwise be unsupportable by network 10 and its components, including receivers 16, if all the processes associated with the steps shown in FIG. 3 must to run in immediate succession of one another may now be implemented on network 10 with this added flexibility to operate other than in immediate succession.

For example, an operator of network 10 may send a process to create the structure of log 161 during a morning. The operator may then send the network requests relating to acquisition of records 100 under step 304 of FIG. 3 to be processed during prime time of the same day. The following day, the operator may then send the network requests for initiating and completing step 305 and 308 for the evaluation of the records to analyze the records 100 captured the previous day to determine if unauthorized signal usage took place at the receiver 16 associated with the records 100. Then, the operator may immediate take one or more preventive action processes 310 that, if unauthorized usage is determined to have occurred at step 308 take optional preventive action by sending a network request to set a flag in the receiver 16, or wait some time before setting the flag. At a later time such as, for example, the following day after the flag is set, a further preventive action process that tests for the presence of the flag and then disable the receiver 16, may then be performed as show in FIG. 13 and discussed in greater detail below.

Multiple versions of processes or network requests may be used and transmitted separately over network 10 to, for example, receivers 16 to implement the various steps and methods described above. For instance, for a given time period or for a given set of channels, a process or network request that in executing steps 305 and 308 referred to in FIG. 3 to evaluates records 100, that only the first detection method described above be used may be sent to one or more receivers 16. For another set of channels, during a different time period, an process or network request that now requests that only the second and third detection method be used at step 308 may be sent to the same, overlapping, or different set of one or more receivers 16.

The ability to separate different steps and processes into multiple sub-processes, and for potentially only certain steps of the method to exist on a receiver 16 at any given time, tends to provide further advantages. The ability of hackers to determine the nature of the measures being taken to detect and prevent unauthorized signal usage and to circumvent such measures may be made more challenging to such hackers by the intermittent presence of various processes or sub-processes of a detection and prevention scheme within a receiver 16 at a particular time. Such process and sub-processes are variable and potentially randomly distributed at the discretion of an operator of network 10. As an example, in an iTV environment, a process that is transmitted with a channel signal to a receiver 16 may be replaced by another process when the viewer selects another channel (that is, another signal) through receiver 16. Thus, the ability of the operator to modify and adapt the processes such as an iTV process to specifically counter measures that may be employed by hackers may tend to be greatly enhanced. Additionally, a process provided in this manner may not require the rigorous testing of, for example, an operating system or other software component of a receiver 16.

Figure 13:
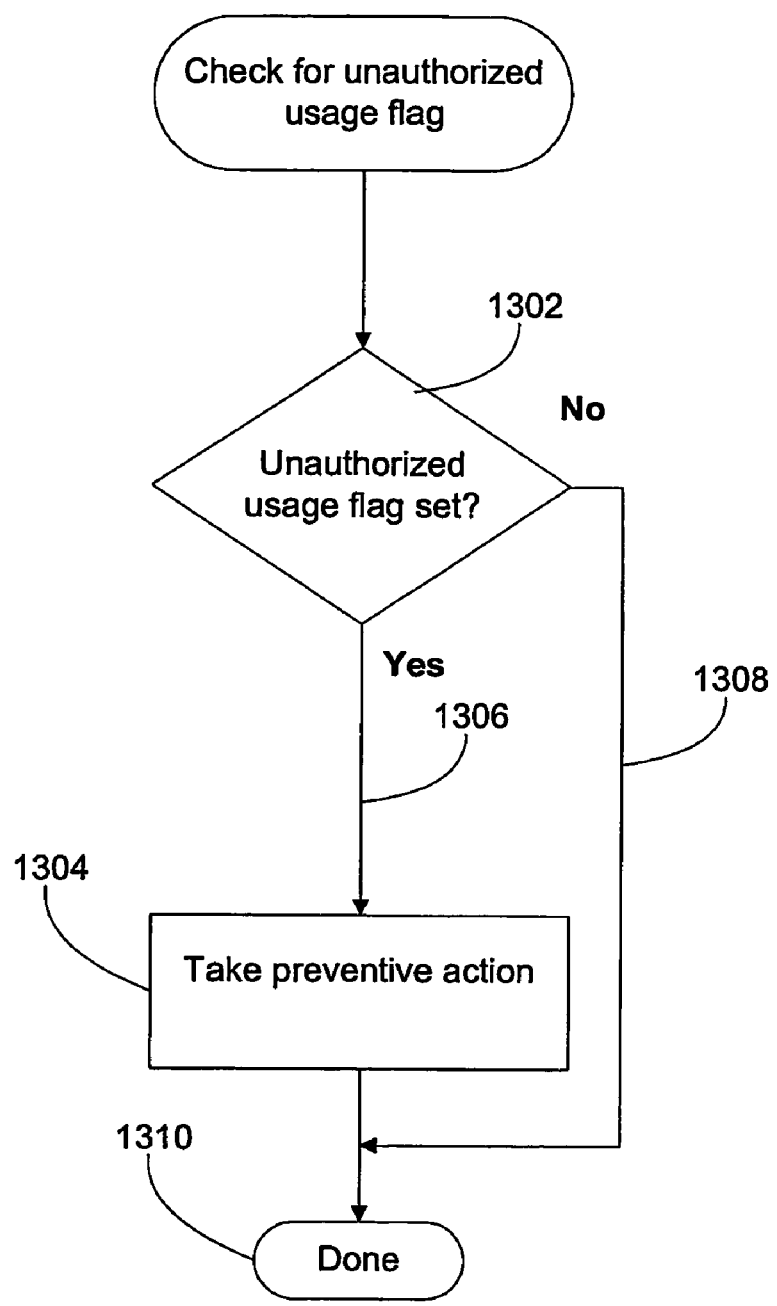
FIG. 13 is a flow diagram of taking action to prevent usage based on verification of a setting of an unauthorized usage flag in the network of FIG. 1.

Referring now to FIG. 13, a flow diagram showing the taking of preventive action, where the process of acquisition of usage records 304 and analysis of usage 305 were executed previously and found unauthorized signal usage and set a flag in receiver 16 identifying such, but without having yet taken any preventive action after unauthorized signal usage was detected, is provided.

At the commencement of a process or network request to take preventative action, step 1302 is performed to tests to see if a flag has been set to indicate unauthorized use of signal on the receiver 16 in question. If such a flag has been set at the receiver 16, then preventive action 1304 is initiated by following path 1306 to step 1304, at which any one or combination of preventive actions describe above may be taken. If at step 1302 it is determined that a flag is not set at the receiver 16, then the preventive action process follows path 1308 to terminate the process at step 1310. A process implementing the steps described with respect to FIGS. 8 and 13 may be associated with one or more channel signals. These channels may or may not be those for which unauthorized usage was detected. In this manner, preventive action such as disabling of viewing capability can be taken on any or all channels, regardless of whether the channel viewing being disabled has been authorized or has been detected to have been previously viewed on an authorized or unauthorized basis for that user at the receiver 16, and independently of the time at which the unauthorized usage detection took place. Such disabling may, for example, be performed by CA 20 restricting access of the receiver 16 in question, or by the receiver 16 stopping to permit usage of one or more signals at the receiver 16.

Separation in time and in delivery and execution of execution of logging, analysis, preventive action and other functions thus tends to provides the benefit of making it more difficult for hackers to establish countermeasures to defeat the unauthorized signal usage detection and prevention schemes describe above, as the various steps can operate at spaced apart intervals, such that an observer seeking to discern a pattern of unauthorized signal usage detection and prevention may not be capable of determining a clear cause and effect behaviour at a receiver 16. The optional preventive action 310 step of FIG. 3 may take different forms, and may affect different services at different times for the time and service on which the user is determined to have made unauthorized usage at a receiver 16, making it difficult for the unauthorized user to discern the pattern of behavior that caused the preventive action to be taken. Furthermore, the timing and selection of channels used by different viewers may cause the timing of preventive action step 310 and the channels on which preventive action step 310 is undertaken to vary from user to user at different receivers 16.

Additional Details

In the embodiment, one or more processes implementing one or more steps described with reference with FIG. 3 may be transmitted to receiver 16 as iTV processes that accompany the various television signals normally sent to receiver 16, in an iTV environment or may be otherwise associated through an EPG or other process with the use or selection of one or more television signals at receiver 16. The processes thus transmitted may be associated with one or more signals, and different processes may be associated with different types of signals. For example, in an iTV environment, a process implementing one of the detection methods described earlier for detecting unauthorized PPV usage may only be associated with PPV channels, and another process implementing a detection of usage of unauthorized combinations of signals may only be transmitted with geographically-restricted signals may be used for other signals.

As a further example, in environments previously discussed with reference to FIG. 9, in a DVB-based digital television distribution environment, the television video signal is typically distributed in a first bit stream, the audio in a second bit stream, and iTV processes in a third bit steam. A single iTV process stream can be associated with multiple channels within the same transport signal bandwidth. In this example, processes from iTV stream iTV1 may be associated with streams audio 1 and video 1 to create Channel 1, and with streams audio 2 and video 2 to create Channel 2.

The distribution of processes and network requests in a network 10 is not described. In an embodiment, processes operated on receiver 16 or other components of network 10 are implemented as one or more interactive television (iTV) processes that are transmitted along with one or more television channels to a television receiver 16. In such an iTV embodiment, a process is transmitted along with one or more television channel signals. When the viewer selects the channel at a receiver 16, the iTV subsystem within receiver 16 captures and executes the process. The process may be provided in a binary executable format, or as code requiring the services of an interpreter, depending on the particular iTV environment's implementation and capabilities.

The process transmission may be implemented as a separate transmission stream that is associated with one or more channels, as would be implemented, for example, in an OpenTV system, or as a stream of data that is embedded within the video or other component of the signal such as the vertical blanking interval, as would be implemented, for example, in a WebTV or Wink iTV application, or in a V-CHIP control sequence. The process as transmitted may also consist or a referral or link to another process available within the receiver, within the same or another transmission stream, or from another server available on a network accessible to the receiver. For example, in a WebTV environment, the application transmitted with the video signal may contain an Internet URL that links to a web site of other source of applications or data.

Figure 9:
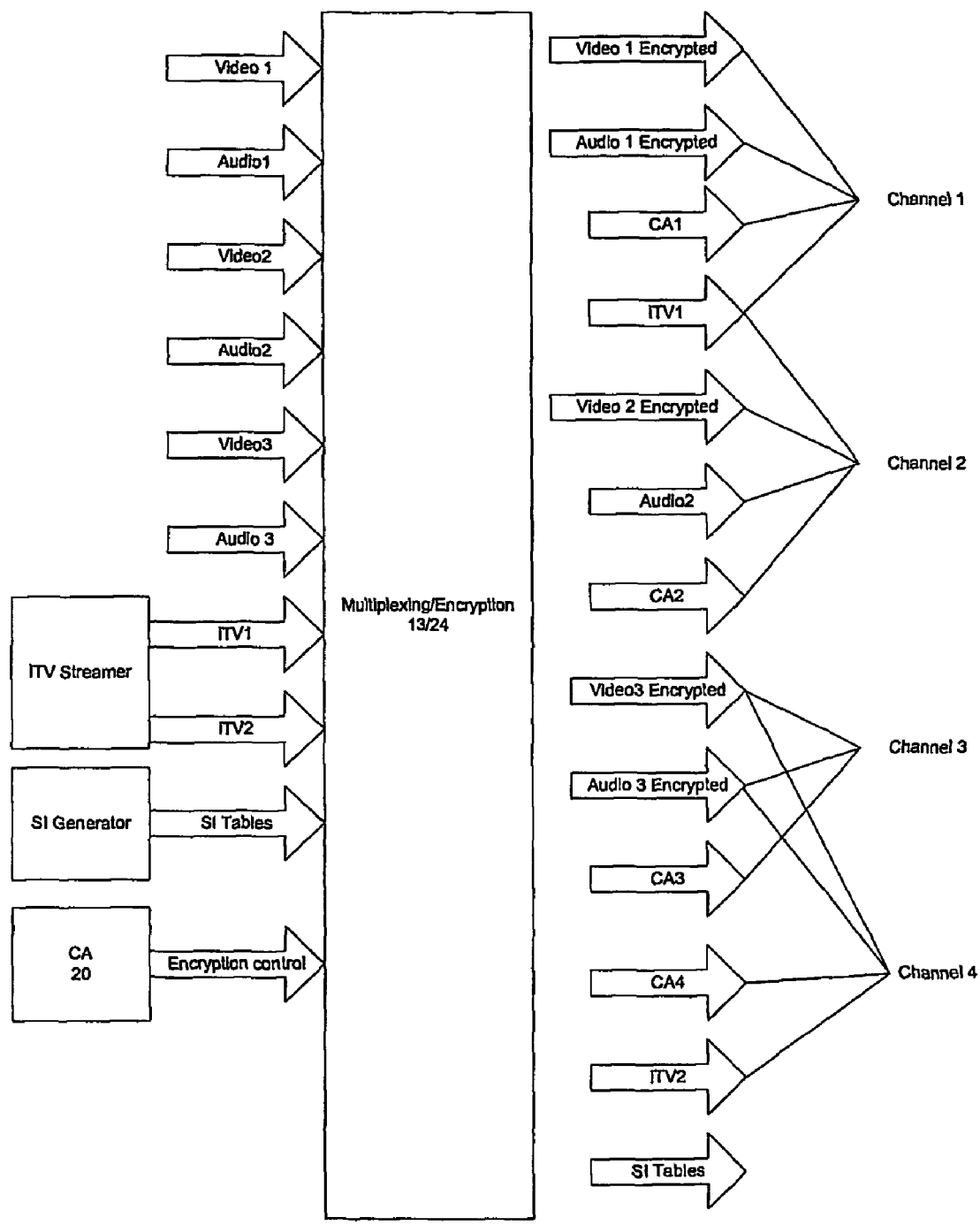
FIG. 9 is a block diagram illustrating the multiplexing of programs, iTV and other streams in the network of FIG. 1.

As shown in FIG. 9, an iTV stream may contain one or more processes may each be associated with one or more channel signals. In the example shown on FIG. 9, the stream iTV1 is associated with Channel 1 and Channel 2, while stream iTV 2 is associated with Channel 4.

The various methods, processes, network requests, steps, schemes or algorithms according to embodiments of the invention described above may be implemented by way of software, hardware or combinations thereof in the various components of network 10. They may be implemented in part or in whole within one or more existing hardware or software components within a receiver 16, on network components of network 10, or combinations thereof. These may include, and are not limited to, the following:

As forming part of or using the capabilities of one or more hardware or software subsystems or combinations thereof of a receiver 16, such as an electronic program guide, a menu system for selecting content, an advertising management system, a measurement and viewing reporting subsystem, a viewing control system such as a V-CHIP parental control subsystem, a copy protection subsystem, or other software or hardware. Subsystems such as these may be activated when a channel change or other content selection is made by the user at the receiver 16, when a change of content occurs on the same system and is indicated by the EPG or by other data transmitted with the content. The methods and processes described above may operate as one or more additional functions within one or more of these subsystems.

As forming part of or using the capabilities of one or more hardware or software subsystems of server components of network 10, or a combination of receiver 16 and server components in network 10. For example, in a switched signal environment such as a DSL network, all channel change requests are transmitted to network components to effect a change to the signal going to a receiver 16. As this network component manages the channel change, it may have the ability to execute one or more functions of the method of the invention, or to pass data or instructions to another server on the network to execute one or more functions of the method of the invention.

As forming part of one or more components of conditional access system 20 used by a receiver 16. The CA 20 may communicate with have hardware or software components within the receiver 16 or have components on network 10 that are capable of executing the functions and processes described above. Components executing the functions may include hardware or software that are built into receiver 16, that are peripheral to the receiver 16 such as a smart card, or that are external to the receiver such as a server for authorization in a switched network environment such as a DSL system.

As forming part of one or more processes that are transmitted to receiver 16 as partial updates to one or more software components, as software associated with content, or as software that is used as content, or as software that is used as a function of receiver 16. For example, an EPG application may consist of an iTV application that can be sent to receiver 16 separately from the main application of receiver 16. The EPG may include one or more steps of the method of the invention, or may in turn include application execution capability that would support a separate application implementing the method of the invention.

As forming part of one or more of any of the above, and one or more sets of one or more data elements each usable by one or more of any of the above that are transmitted to or otherwise accessible from one or more or any of the above. These data elements may act as parameters to control the operation of the method. For example, data elements transmitted within the EPG data may contain the list of channels on which the method is to be executed, or which components of the method.

The methods and processes described above may be built into receivers 16, network components of network 10, or combinations thereof. Additionally, receivers 16, network components of network 10, or combinations thereof may be updated to contain one or more steps or processes of an embodiment of the invention by a software update, firmware update, hardware or peripheral device update such as a smart card, or combinations thereof. For example, many digital television receivers on satellite networks are equipped to check for software updates being transmitted, and to receive and load these updates. In many such cases, such receivers 16 have the ability to receive software or firmware updates, and the software update being transmitted may include one or more components of processes and methods for implementing aspects of the embodiments described. Other methods of triggering or effecting a receiver 16 or server software or hardware update are known to those skilled in the art.

Other methods are available for loading software and data on to receivers 16 may include, but are not limited to:

repeated transmission of the software, and the receiver 16 periodically checking for the transmission. For example, on many satellite television receivers, turning receiver 16 off using the remote control or a front panel button puts the receiver in a mode where the receiver monitors satellite transmissions for software and data updates. Messages can also be sent to one or more receivers 16 to switch to the software update detection and loading state.

receiver 16 checking for available updates from one or more network servers. The receiver 16 may do this by communicating with one or more network servers, or broadcasting a request for information on any updates available. This type of request is typically based on a trigger such as a receiver 16 being turned off, turned on, connected to electrical power, or other deliberate or unintentional user-initiated event.

Environments in which the schemes of detecting and preventing unauthorized signal usage described above are now described. In one embodiment, receiver 16 may be provided for a television distribution system such as a direct-to-home satellite television environment. Other embodiments may include:

Television distribution networks, whether wired or wireless, or analog or digital, such as cable television, multichannel multipoint distribution service (MMDS) microwave, terrestrial broadcast, switched networks such as high-speed digital subscriber loop (DSL) and fiber-optic based networks, with receivers for the respective networks or receiving functions built into the television.

Switched and broadcast networks for distribution of other forms of audio, video, data, games, software or other forms of digital content, including cellular telephone networks, gaming networks for video games, digital radio networks, the Internet, and others.

Receiving devices such as cellular telephones, personal digital assistants (PDAs), personal computers, cable and DSL modems, home entertainment systems, video games consoles, televisions with built-in receivers, audio receivers and other devices. The devices may be designed for real-time playback, for downloading of content for subsequent playback, or for both.

Figures 14, 14A, 14B, 14C:
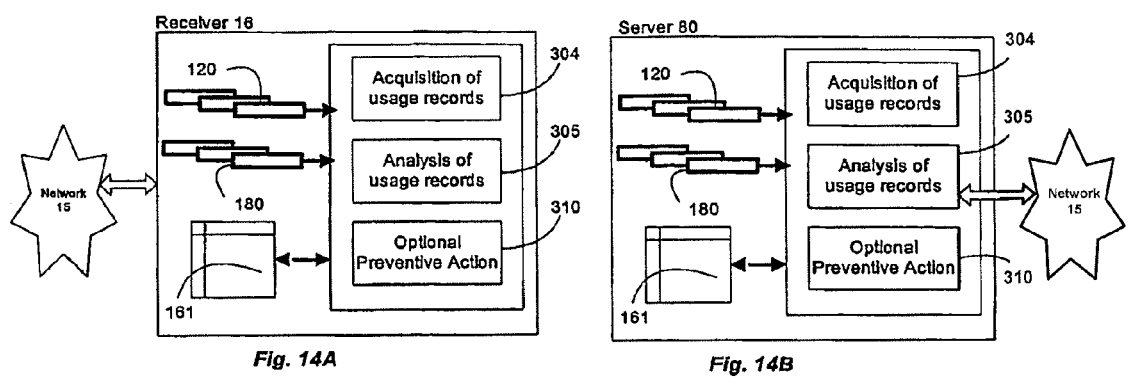
FIG. 14A illustrates the distribution of unauthorized usage detection process steps in a receiver in the network of FIG. 1.
FIG. 14B illustrates the distribution of unauthorized usage detection process steps in a network server component in the network of FIG. 1.
FIG. 14C illustrates the distribution of unauthorized usage detection process steps between a receiver and a network server component in the network of FIG. 1.

Referring now to FIGS. 14A-14C, some of the possible distribution of processes within various embodiments is shown.

FIG. 14A shows an implementation of an embodiment within a television receiver 16. The receiver 16 contains elements capable of executing a series of functions implemented in hardware, software, or combinations thereof to receive, decode and present television content to the viewer, and to allow the viewer to access or retrieve the content In such an implementation, the steps of the method and the data accessed or created by the method may be available from the various subsystems that may be implemented in hardware or software within receiver 16, examples of which are described above. The delivery of processes, data and other elements to receiver 16 may be dependent on other devices and subsystems available on network 10 or in receiver 16, examples of which are described above.

FIG. 14B shows an implementation of a method of an embodiment where the functions of the method are implemented on one or more server 80 components which are external to receiver 16. As an example of such a system, in a switched environment such as the Internet or a DSL system, receiver 16 requests a particular content stream, which may then be transmitted to the receiver 16. One or more processes implementing the method of the embodiment may therefore take place outside of the receiver 16 in the system that receives the channel change requests, or on a system which can receive or access the channel change request data from the server 80. Other examples where one or more functions of the method are provided in one or more server 80 components are provided in other embodiments.

FIG. 14C shows an implementation of an embodiment wherein the functions of the various detection methods are distributed between one or more server 80 components and a receiver 16. A given function or feature of the method may be located on a single server 80 or receiver 16, or may be distributed between one or more servers 80 and a receiver 16. In the embodiment shown in FIG. 14C, the acquisition of usage records take place on the receiver 16. However, the log of usage records 161 is stored on server 80. The analysis of usage records also takes place on server 80. Other features of the method of the embodiment, such as obtaining parameter list 180 to direct one or more of the processes of the method, may be present on servers 80 and receivers 16. The optional preventive action step 310 has elements on both the server 80 component and the receiver 16 component. As an example, on the server 80, the optional preventive action 310 process may generate a list of parameters or commands for transmission to one or more receivers 16. On receiver 16, the optional preventive action 310 process may receive the commands or parameters in order to perform the appropriate preventive action.

In an embodiment described above, the method of detecting unauthorized signal usage as previously described is initiated following a channel change on the receiver 16. The method or steps of the method may be initiated in other ways, including but not limited to:

Initiating execution following a user-generated trigger event on receiver 16. The operating system, iTV subsystem or other software on receiver 16 may provide facilities to initiate a designated process or instructions following a given user initiated event. These can include channel changes, selection of a channel on the EPG, turning receiver 16 on or off, selecting the "previous channel" function, or other functions. In many receivers 16, turning receiver 16 off does not completely power off the receiver 16, and functions may still be initiated in an "off" state.

Periodic execution based on a timer triggered by the receiver 16 operating system.

Periodic execution based on a timer triggered by a component of network 10.

A trigger based on a software or hardware interrupt from a receiver 16 operating system or other hardware or software subsystem indicating a state change, which, in the television environment, would be a channel change.

Initiation of the process by another process such as an electronic program guide (EPG), a viewing measurement process or other process.

Other methods of initiating a process on receiver 16 may be used in other embodiments.

Although the present invention has been described in terms of various embodiments, it is not intended that the invention be limited to these embodiments. Modifications within the spirit of the invention will be apparent to those of skill in the art. For example, usage of a signal may be initiated by processes or systems internal or external to receiver 16, such as personal video recorder (PVR) device or process, a computer, or other component designed to select, record or transmit content on behalf of the user.

The compromising of security on digital television systems is typically limited to attacks on the conditional access system 20 of network 10. Compromised receivers 16 will often continue to receive core software and operating system updates, iTV processes, electronic program guide updates and other software. Embodiment of the present invention may in such circumstances therefore be implemented on receivers 16 that have already been compromised to reduce and control unauthorized signal usage.

Embodiments of the present invention may be deployed in conjunction with various subscriber receivers 16 such as television set-top boxes, television and audio receivers, personal computers or personal digital assistants, mobile telephone handsets or other handheld communication devices and the like. Moreover, the embodiments of the present invention may be used to detect unauthorized signal usage in relation to numerous categories of deliverable content, whether in the form of voice, video, sound, executable applications, data or the like, including any combinations thereof.

It will be appreciated from the above examples that a myriad of components and methods may be used to implement embodiments of the invention. Although the invention has been described with reference to certain specific embodiments, various modifications thereof will be apparent to those skilled in the art without departing from the spirit and scope of the invention as outlined in the claims appended hereto.

I claim:

1. A method for detecting unauthorized signal usage in a content delivery network, the method comprising the steps of:

acquiring at least two signal usage records for a receiver of said content, each signal usage record having indicia of actual usage associated therewith;

evaluating the respective indicia of actual usage for said at least two signal usage records against a predetermined combination of indicia of usage that are associated with a combination of signals not authorized for usage together on said receiver; and detecting unauthorized signal usage upon said respective actual usage indicia for said at least two signal usage records being consistent with said predetermined combination of indicia, regardless of whether each instance of signal usage associated with the at least two actual signal usage records have been previously individually authorized for usage with said receiver.

2. The method according to claim 1, wherein said predetermined combination of indicia of usage includes use at said receiver of at least two signals each of which is only normally authorized for use in mutually distinct geographic locations.

3. The method according to claim 1, wherein said predetermined combination of indicia of usage is associated with geographic blackout regions, wherein geographic locations in which usage is authorized for any one signal of said combination of signals by reference to its respective blackout region is exclusive from geographic locations in which usage is authorized for any one other of said geographic blackout regions associated with every other signal of said combination of signals.

4. The method according to claim 1, further comprising the step of disabling said receiver upon detecting unauthorized signal usage at said receiver.

5. The method according to claim 4, wherein at least one of the steps of acquiring at least two signal usage records, evaluating the respective indicia of actual usage of said at least two usage signal records, detecting unauthorized signal usage and disabling said receiver is performed at a different time than in immediate succession to each other of the said steps.

6. The method according to claim 5, wherein the steps of acquiring at least two signal usage records, evaluating the respective indicia of actual usage of said at least two usage records, detecting unauthorized signal usage and disabling said receiver are performed by said receiver.

7. The method according to claim 5, wherein said content delivery network includes a conditional access system in communication with said receiver, and the steps of acquiring at least two signal usage records, evaluating the respective indicia of actual usage of said at least two signal usage records, detecting unauthorized signal usage and disabling said receiver are performed by said conditional access system.

8. The method according to claim 5, wherein said content delivery network includes a conditional access system in communication with said receiver, and said receiver performs at least one of the steps of acquiring at least two signal usage records, evaluating the respective indicia of actual usage of said at least two signal usage records, detecting unauthorized signal usage and disabling said receiver, and the conditional access system performs a said step other than the said at least one of the steps.

9. The method according to claim 5, wherein said receiver is associated with an interactive television system.

10. The method according to claim 2, wherein the said steps of evaluating the respective indicia of actual usage of said at least two signal usage records and detecting unauthorized signal usage are performed by at least one of said receiver, an advertising management system, a blackout control subsystem, a conditional access system, a multiplexer; and a parental control system, in each case being connected to said content delivery network.

11. The method according to claim 1, wherein said predetermined combination of indicia of usage includes indicia of concurrent usage of two or more pay-per-usage signals.

12. The method according to claim 11, wherein said indicia of concurrent usage of two or more pay-per-usage signals include indicia of usage of said two or more pay-per-usage signals within a predetermined period of time.

13. The method according to claim 11, wherein said indicia of concurrent usage of said two or more pay-per-usage signals include indicia of picture-in-picture presentation of at least two of said two or more pay-per-usage signals.

14. The method according to claim 11, wherein said indicia of concurrent usage of said two or more pay-per-usage signals include indicia of recording of at least one of said two or more pay-per-usage signals while another of said two or more pay-per-usage signal is being used.

15. The method according to claim 11, wherein said indicia of concurrent usage of said two or more pay-per-usage signals include indicia of multi-channel presentation of said two or more pay-per-usage signals.

16. The method according to claim 15, wherein said indicia of multi-channel presentation include presentation of said two or more pay-per-usage signals in an electronic program guide.

17. The method according to claim 11, further comprising the step of disabling said receiver in said content delivery network upon detecting unauthorized signal usage at said receiver.

18. The method according to claim 17, wherein at least one of the said steps of acquiring at least two signal usage records, evaluating the respective indicia of actual usage of said at least two signal usage records, detecting unauthorized signal usage, and disabling said receiver is performed at a different time than in immediate succession to each other of the said steps.

19. The method according to claim 18, wherein said steps of acquiring at least two signal usage records, evaluating the respective indicia of actual usage of said at least two signal usage records, detecting unauthorized signal usage and disabling said receiver are performed by said receiver.

20. The method according to claim 18, wherein said content delivery network includes a conditional access system in communication with said receiver, and said steps of acquiring at least two signal usage records, evaluating the respective indicia of actual usage of said at least two signal usage records, detecting said unauthorized signal usage and disabling said receiver are performed by said conditional access system.

21. The method according to claim 18, wherein said content delivery network includes a conditional access system in communication with said receiver, and said receiver performs at least one of said steps of acquiring at least two signal usage records, evaluating the respective indicia of actual usage of said at least two signal usage records, detecting unauthorized signal usage and disabling said receiver, and the conditional access system performs a said step other than the said at least one of said steps.

22. The method according to claim 18, wherein said receiver is associated with an interactive television system.

23. The method according to claim 11, wherein the said step of evaluating the respective indicia of actual usage of said at least two signal usage records and detecting unauthorized signal usage are performed by at least one of said receiver, an advertising management system, a blackout control subsystem, a conditional access system, a multiplexer; and a parental control system, in each case being connected to said content delivery network.

24. The method according to claim 20, wherein said receiver is associated with an interactive television system.

25. The method of claim 1, further comprising acquiring a geographic indicia for said receiver to identify a geographic location associated with the receiver, and wherein said predetermined combination of indicia of usage include at least two of:
use at said receiver of at least two signals each of which is only normally authorized for use in mutually distinct geographic locations;

use at said receiver of a signal not normally authorized for usage in the geographic location associated with said receiver; and concurrent usage of two or more pay-per-usage signals.

26. A system for detecting unauthorized signal usage in a content delivery network, comprising:

a processor; and a computer-readable storage medium in communication with the processor, the computer-readable storage medium having computer-readable instructions thereon, the computer-readable instructions including instructions executable by the processor for:

acquiring at least two signal usage records for a receiver of said content, each signal usage record having indicia of actual usage associated therewith;

evaluating the respective indicia of actual usage for said at least two signal usage records against a predetermined combination of indicia of usage that are associated with a combination of signals not for usage together on said receiver; and detecting unauthorized signal usage upon said respective actual usage indicia for said at least two signal usage records being consistent with said predetermined combination of indicia, regardless of whether each instance of signal usage associated with the at least two actual signal usage records have been previously individually authorized for usage with said receiver.

27. The system for controlling unauthorized signal usage of claim 26, wherein the computer-readable instructions further include instructions executable by the processor for disabling said receiver upon detecting unauthorized signal usage at said receiver.

28. The system for controlling unauthorized signal usage of claim 27, wherein the said steps of record acquisition, and evaluation and disabling each executes at a different time than in immediate succession to each other.

29. The system for controlling unauthorized signal usage of claim 28, wherein said predetermined combination of indicia of usage are maintained in a data set, and wherein the said steps of record acquisition, evaluation and disabling, ad said data set, are associated with at least one network element in said content delivery network.

30. The system for controlling unauthorized signal usage of claim 29, wherein one of said at least one network element is any one of said receiver, an advertising management system, a blackout control system, a conditional access system, a multiplexer and a parental control system.

31. The system for controlling unauthorized signal usage of claim 30, wherein said predetermined combination indicia of usage include use at said receiver of at least two signals each of which is only normally authorized for use in mutually distinct geographic locations.

32. The system for controlling unauthorized signal usage of claim 31, wherein each instance of signal usage associated with the at least two actual signal usage records is associated with a geographic blackout region, wherein geographic locations in which usage is normally authorized for any one signal of said at least two actual signal usage records by reference to its respective blackout region is distinct from geographic locations in which usage is normally authorized for any one other of said at least two geographic blackout regions associated with every other signal of said at least two actual signal usage records.

33. The system for controlling unauthorized signal usage of claim 30, wherein said predetermined combination of indicia of usage include concurrent usage of two or more pay-per-usage signals.

34. The system for controlling unauthorized signal usage of claim 33, wherein said predetermined combination of indicia of concurrent usage of two or more pay-per-use signals include indicia of usage of said two or more pay-per-usage signals within a predetermined period of time.

35. The system for controlling unauthorized signal usage of claim 33, wherein said predetermined combination of indicia of concurrent usage of said two or more pay-per-usage signals include indicia of picture-in-picture presentation of at least two of said two or more pay-per-usage signals.

36. The system for controlling unauthorized signal usage of claim 33, wherein said predetermined combination of indicia of concurrent usage of said two or more pay-per-usage signals include indicia of recording of at least one of said two or more pay-per-usage signals while another of said two or more pay-per-usage signals is being used.

37. The system for controlling unauthorized signal usage of claim 33, wherein said predetermined combination of indicia of concurrent usage of said two or more pay-per-usage signals include indicia of multi-channel presentation of said two or more pay-per-usage signals.

38. The system for controlling unauthorized signal usage of claim 33, wherein said predetermined combination of indicia of multi-channel presentation include presentation of said two or more pay-per-usage signals in an electronic program guide.

39. The system for controlling unauthorized signal usage of claim 30, wherein said mstep of acquiring further includes acquiring a geographic indicia for said receiver to identify a geographic location associated with said receiver, and said predetermined combination of indicia of usage includes indicia of usage of a signal not normally authorized for usage in the geographic location of said receiver.

40. The system for controlling unauthorized signal usage of claim 39, wherein said indicia of usage of a signal not normally authorized on said receiver include indicia of usage corresponding to a signal controlled by a geographic blackout region which does not normally permit usage of the signal in the geographic location of said receiver.

41. The system for controlling unauthorized signal usage of claim 39, wherein said geographic indicia comprise data associated with the time zone of the said geographic location.

42. The system for controlling unauthorized signal usage of claim 39, wherein said geographic indicia comprise data associated with a global positioning system.

43. The system for controlling unauthorized signal usage of claim 39, wherein said geographic indicia comprise data associated with the postal code of the said geographic location.

44. The system for controlling unauthorized signal usage of claim 30, wherein said step of acquisition further includes acquiring a geographic indicia associated with said receiver, and said geographic indicia include at least two of:

use at said receiver of at least two signals each of which is only normally authorized for use in mutually distinct geographic locations;

use at said receiver of a signal not normally authorized for usage in the geographic location associated with said receiver; and concurrent usage of two or more pay-per-usage signals.

45. A system for detecting unauthorized signal usage in a content delivery network, the system comprising:

a processor, wherein the processor is configured to:

acquire at least two signal usage records for a receiver of said content, each signal usage record having indicia of actual usage associated therewith;

evaluate the respective indicia of actual usage for said at least two signal usage records against a predetermined combination of indicia of usage that are associated with a combination of signals not authorized for usage together on said receiver; and detect unauthorized signal usage upon said respective actual usage indicia for said at least two signal usage records being consistent with said predetermined combination of indicia, regardless of whether each instance of signal usage associated with the at least two actual signal usage records have been previously individually authorized for usage with said receiver.

* * * * *